United States Patent [19]
Nishiguchi

[11] Patent Number: 6,128,059
[45] Date of Patent: Oct. 3, 2000

[54] STEREOSCOPIC OPTICAL ELEMENT INCLUDING A BIREFRINGENT PHOTOSENSITIVE FILM HAVING REGIONS OF MUTUALLY DIFFERENT PRESCRIBED SLOW AXES OR FAST AXES, AND AN IMAGE DISPLAY DEVICE USING THE SAME

[75] Inventor: Kenji Nishiguchi, Osaka, Japan

[73] Assignee: Sharp Kabushiki Kaisha, Osaka, Japan

[21] Appl. No.: 09/502,090

[22] Filed: Feb. 10, 2000

Related U.S. Application Data

[62] Division of application No. 09/038,063, Mar. 11, 1998, Pat. No. 6,046,787.

[30]  Foreign Application Priority Data

Mar. 13, 1997  [JP]  Japan ..................................... 9-058198

[51] Int. Cl.[7] ....................... G02F 1/1337; G02F 1/1335; G02B 27/22
[52] U.S. Cl. ........................... 349/129; 349/15; 349/119; 349/120; 349/121; 359/462
[58] Field of Search .............................. 349/15, 117, 119, 349/120, 121, 129, 187, 191; 359/462

[56]  References Cited

U.S. PATENT DOCUMENTS

| 4,983,911 | 1/1991 | Henley | 324/158 |
|---|---|---|---|
| 5,537,144 | 7/1996 | Faris | 348/58 |
| 5,553,203 | 9/1996 | Faris | 395/115 |
| 5,602,661 | 2/1997 | Schadt | 349/124 |
| 5,686,975 | 11/1997 | Lipton | 349/15 |
| 5,694,187 | 12/1997 | Abileah et al. | 349/120 |
| 5,784,139 | 7/1998 | Chigrinov et al. | 349/117 |
| 5,818,615 | 10/1998 | Abileah et al. | 359/73 |
| 5,831,703 | 11/1998 | Nishiguchi et al. | 349/117 |
| 5,861,931 | 1/1999 | Gillian et al. | 349/15 |
| 5,886,816 | 3/1999 | Faris | 359/464 |

*Primary Examiner*—William L. Sikes
*Assistant Examiner*—Tarifur R. Chowdhury
*Attorney, Agent, or Firm*—Nixon & Vanderhye P.C.

[57]  ABSTRACT

An optical element includes a transparent substrate having a main surface, a first birefringent photosensitive film arranged on a first region of the main surface such that a slow axis or a fast axis is aligned with a prescribed first direction, and a second birefringent photosensitive film formed on a second region different from the first region of the main surface such that the slow axis or the fast axis is aligned with a prescribed second direction different from the first direction. The first and second directions are different by 90° (±20°, more preferably, ±10°). An image display device employing the optical element further includes an image forming device such as a liquid crystal display device, and with the optical element arranged on an image display screen, stereoscopic imaging is possible.

8 Claims, 15 Drawing Sheets

STEREOSCOPIC OPTICAL ELEMENT INCLUDING A BIREFRINGENT PHOTOSENSITIVE FILM HAVING REGIONS OF MUTUALLY DIFFERENT PRESCRIBED SLOW AXES OR FAST AXES, AND AN IMAGE DISPLAY DEVICE USING THE SAME

CROSS REFERENCE TO RELATED APPLICATIONS

This is a divisional of application Ser. No. 09/038,063, filed Mar. 11, 1998, now U.S. Pat. No. 6,046,787, the entire content of which is hereby incorporated by reference in this application.

The present application is related to copending patent applications, U.S. Ser. No. 08/702,763 and U.S. Ser. No. 08/975,226, which are incorporated herein by reference.

BACKGROUND OF THE INVENTION

1. Field of the Invention

The present invention relates to a stereoscopic optical element. More specifically, the present invention relates to an optical element having birefringent photosensitive films arranged on a plurality of regions and having mutually different slow axes or fast axes, and an image display device capable of providing a two-dimensional or three-dimensional display using the optical element.

2. Description of the Background Art

Conventionally, an optical element such as a retarder film has been fabricated by uniaxial rolling of a polymer film. Therefore, in the optical element such as the retarder film fabricated in this manner, the direction of slow axes or fast axes is uniform throughout the plane. Inventors including inventors of the present invention proposed a birefringent new photosensitive film in U.S. Ser. No. 08/702,763 (corresponding to Japanese Patent Laying-Open No. 9-068699). In this copending application, the photosensitive film is used in a liquid crystal display having an optically isotropic polymer region such as a polymer wall and a liquid crystal region filled with liquid crystal in a liquid crystal display panel, as an optical element for independent color compensation of the liquid crystal region and the polymer region, utilizing the retarder film.

There is a long history of various attempts to reproduce a three-dimensional image or a stereoscopic image. Various and many attempts including a laser hologram and the like have been known. However, only the following three methods can be named as highly complete methods of stereoscopic image display, capable of displaying motion pictures in full color using three primary colors. In these methods, images for the right eye and the images for the left eye are provided separate from each other, based on the principle that the viewer feels the field of depth because of binocular parallax, that is, offset between the images for the left and right eyes.

(1) The first method is Field Sequential Shuttered Glasses Stereoscopic, in which images for the left and right eyes are displayed alternately in time-divisional manner by one display device. Glasses having electric shutter function are alternately opened/closed in synchronization with the displayed image, thereby realizing stereoscopic image display. This method is applicable both to projection display and direct view display.

(2) The second method is Autostereoscopic Imaging. In this method, striped images for both left and right eyes in lengthwise or widthwise direction displayed on an image display device are allotted to the left and right eyes by a lenticular sheet or a slitted plate in the lengthwise or widthwise direction placed in front of the display device. In this manner, this method allows viewing a stereoscopic image without mounting any specific binocular or eyeglasses.

(3) The third method is Polarizing Binocular Stereoscopic Imaging. In this method, images for the left and right eyes are linearly polarized with directions of polarization forming an angle of 90° with each other, and the images are observed by a polarizing binocular, thus enabling stereoscopic image display. For projection display, two polarizing projectors are used and two images are overlapped on a screen. For direct view display, images of two display devices are synthesized by a half mirror or a polarizing mirror.

The first method mentioned above is advantageous in that stereoscopic image display is possible by only one display device. However it is disadvantageous in that the viewer must wear a binocular or eyeglasses having electric shutter function (for example, liquid crystal shutter eyeglasses). Such eyeglasses are heavy, unavoidably causing fatigue of the viewer when used for a long period of time. In addition, such eyeglasses with shutter function are expensive. Since one viewer needs one binocular, the cost for purchasing the necessary number of binoculars corresponding to the number of viewers would be formidable.

The stereoscopic image obtained by the second method is advantageous that the image can be observed without the necessity for the viewer to wear a special binocular or the like. However, Autostereoscopic Imaging is disadvantageous in that a zone allowing stereoscopic imaging is very narrow. The reason will be described with reference to an example employing a lenticular lens.

Referring to FIG. 9, which is a plan view of a display device 900 and a viewer 907 viewed from above, a zone Y1r allowing stereoscopic view in left/right direction will be described. Display device 900 has an arrangement of a plurality of components 901 including pixels for right eye 901(r) and pixels for left eye 901(l), with a black matrix 902 provided between each of the components 901. On an entire surface of display device 900, a lenticular sheet 905 having cylindrical lenses 906 at a pitch of left and right two components, is adhered by an adhesive 904. Images are allotted to the left and right eyes of viewer 907 by lenticular sheet 905.

At this time, when the left eye of viewer 907 is positioned in the range between C–D of FIG. 9 and the right eye of viewer 907 is positioned in the range between E–F, a normal stereoscopic image is observed by viewer 907. However, when both eyes of viewer 907 move and one of the eyes is positioned in the range between D–E, for example, that eye sees the non-display portion responding to the black matrix 902, and hence a stereoscopic image cannot be observed. The same applies when one of the eyes is positioned between B–C or F–G. Further, when the left eye is positioned between E–F and the right eye is positioned between G–H, the left and right images are inverted, and a normal stereoscopic image cannot be observed. Therefore, in the second method, in principle, the width of one zone allowing stereoscopic view cannot exceed the space between both eyes of the viewer.

Further, when both eyes of the viewer move exceeding that range in which left and right images are inverted, a region (side lobe) where a normal image is again observed appears. In this Autostereoscopic Imaging, it may possible for a few viewers to observe stereoscopic images by positively utilizing the side lobes. However, the zone allowing stereoscopic view of each side lobe is also very narrow.

A zone allowing stereoscopic view in the forward/rearward direction will be described with reference to FIGS. 9 and 10. In FIG. 10, portions corresponding to those of FIG. 9 are denoted by the same reference characters. Referring to FIG. 9, assume that light beams 1, 2, . . . , 7, 8 are emitted from display components in which left and right two components constitute a set, from opposing ends and the center of display device 900. At this time, the zone allowing stereoscopic view in the forward/rearward and left/right directions is represented by hatched portions in FIG. 10. Here, the space between both eyes of viewer 907 will be represented by e, lateral length of display device 900 by Hh, and a distance at which widest zone allowing stereoscopic view in the left/right direction is obtained (optimal distance for stereoscope) by L (when a stereoscopic image is viewed from a position at a distance L, the zone allowing stereoscopic view in left/right direction becomes the widest). Distances by which viewer 907 can move in the forward and rearward directions from the optimal distance L for stereoscope can be represented by the following equations (1) and (2), in accordance with expressions described in "Autostereoscopic 3-D Television Using Eight TV Cameras" (H. Isono et al., *NHK Technical Laboratory R&D*, November, 1995, pp. 43–54).

Zone allowing stereoscopic view in forward direction $$Yf = e \times L / (Hh + 2 \times e) \quad (1)$$

Zone allowing stereoscopic view in rearward direction $$Yb = e \times L / Hh \quad (2)$$

Assume that a TFT liquid crystal display panel having a 10.4 inch diagonal (length H=156 mm, width Hh=208 mm) is used as display device 900. When we assume that the space between both eyes of the viewer is 65 mm and the observing distance L=350 mm, the distance by which the viewer can move forward or rearward would be Yf=67 mm and Yb=109 mm from equations (1) and (2). When the viewer moves forward or rearward exceeding this scope, stereoscopic image cannot be observed.

Further, there is a problem that stereoscope obtained by the side lobe is inferior in quality. Japanese Patent Laying-Open No. 4-16092 discloses a method of removing a side lobe by using a light-blocking plate, in order to solve this problem.

The concept of the method disclosed in this laid-open application will be described with reference to FIG. 11. Referring to FIG. 11, in this method, in front of a lenticular sheet 802 having cylindrical lenses arranged periodically in a horizontal direction of a display screen 802, a light-blocking plate 803 for limiting a viewing angle in the horizontal direction of the display screen is arranged. Each cylindrical lens extends parallel to a direction vertical to the display screen. Light-blocking plate 803 has a light-shielding layer 804 provided along the direction vertical to the display screen, and removes the side lobe by blocking light beam from components other than the proper left and right components. In this method, stereoscopic observation utilizing only the main lobe with high image quality is realized.

Further, Japanese Patent Laying-Open No. 6-335030 discloses a stereoscopic image display device provided with a mask for changing optical path of light beams, corresponding to non-transmitting portion between the lenticular sheet and the display device. The concept is as shown in FIG. 12. Referring to FIG. 12, a diffusion plate 706 having a diffusion layer 702 is arranged in front of a region of a non-displaying portion 705 (black matrix) existing between a pixel for left eye and a pixel for right eye. Diffusion plate 706 diffuses light beams from portions other than the non-displaying portion, thus a stereoscopic image is obtained while suppressing generation of a black fringe.

Finally, the third method includes a method which allows observation of a two-dimensional image normally and allows observation of a stereoscopic image by mounting a polarizing binocular. In this method, for projection display, two polarizing projectors are used and two images are overlapped on the screen, for forming a stereoscopic image. For direct view display, images from two display devices are synthesized by a half mirror or a polarizing mirror, or polarizing transmission axes of polarizing film arranged on a substrate surface are made different component by component, whereby images with different states of polarization are formed for the right eye and the left eye.

The stereoscopic image thus obtained is free of any flickers, and the viewer can observe the stereoscopic image by wearing a very light and inexpensive polarizing binocular. However, in order to provide two images with different polarization axes simultaneously without fail, two display devices or two projectors are necessary. Accordingly, the system is too expensive for family use.

Another example of the third method is disclosed in Japanese Patent Laying-Open No. 58-184929. In this method, mosaicwise polarizing layer in which polarization axes cross orthogonal to each other between adjacent components is tightly adhered on a front surface of one display device, and a viewer can observe a stereoscopic image by wearing a polarizing binocular.

In this method, referring to FIG. 13, on a front surface of a glass layer 604 providing a face plate, such as a CRT on which pixels for right eye 607 and pixels for left eye 605 are allotted, polarizing plates 602a and 602b having mutually orthogonally intersecting polarization axes are arranged. Polarizing layers 602a and 602b are patterned mosaicwise with the size of each mosaic being at a pixel level, such that polarizing transmission axes of adjacent components intersect orthogonal to each other. Since polarization layers 602a and 602b are patterned in the order of micrometer in accordance with the size of the pixel level, such polarization layers will be hereinafter referred to as micropolarization plate. It is possible for the viewer to observe a stereoscopic image when the viewer observes images displayed on the CRT or the like through polarization binocular 603 provided with polarization plates 603a and 603b of which left and right polarization axes intersect orthogonally with each other. Therefore, a large number of viewers may observe stereoscopic images by wearing the polarization binoculars.

Japanese Patent Laying-Open No. 62-135810 discloses a display device capable of stereoscopic image display using a single display device, by providing a polarization layer having partially different polarization directions, inside a glass substrate constituting a liquid crystal display device. The concept is as shown in FIG. 14. A liquid crystal display device includes a liquid crystal layer 505 sealed in a region between a pair of glass substrates 501a and 501b, with its periphery sealed by a seal 506. Glass substrates 501a and 501b are provided with interconnection layers 503a and 503b for applying a voltage to liquid crystal layer 505, and alignment films 504a and 504b for aligning liquid crystal molecules of liquid crystal layer 505, respectively. As can be seen from FIG. 14, polarization layers 502a and 502b having partially different polarization directions are provided between interconnection layers 503a, 503b and glass substrates 501a, 501b, respectively.

Further, U.S. Pat. No. 5,537,144 discloses a stereoscopic display device in which a liquid crystal panel and a micropolarization plate fabricated by patterning a rolled polyvinylalcohol layer using a resist material are combined. Referring to FIG. 18, according to U.S. Pat. No. 5,537,144, a micropolarization plate 302 is superposed on an SMI (Spatially Multiplexed Image) 301 displaying in complexed manner, images for the right eye and for the left eye, and the viewer observes wearing polarization binocular 603 provided with polarization plates 603a and 603b of which left and right polarization axes intersect orthogonally with each other, whereby a stereoscopic display is obtained.

In Autostereoscopic Imaging described as the second method, the width in the left/right direction of the zone allowing stereoscopic imaging is limited to a very narrow range as shown in FIGS. 9 and 10, and the zone is also limited in the forward/rearward direction. Further, in this method, two components arranged in the direction of signal lines (horizontal direction on the screen) are used as one set for stereoscopic display. For this reason, the zone allowing stereoscopic imaging is further narrowed because of a non-displaying portion (black matrix) existing between the two components.

In the image display device disclosed in Japanese Patent Laying-Open No. 4-16092 shown in FIG. 11 and Japanese Patent Laying-Open No. 6-335030 shown in FIG. 12, it is possible to provide stereoscopic image display resulting from main lobe only with high quality, or stereoscopic image display with generation of the black fringe derived from the presence of the non-displaying portion suppressed, as described above. However, means for allotting the left and right images to both eyes of the viewer is the lenticular sheet. The lenticular sheet employs a plurality of cylindrical lenses arranged to correspond to a total of two components, that is, one for the left eye and one for the right eye, arranged in the horizontal direction on the display screen. Therefore, when a two-dimensional image is observed by such an image display device, the horizontal resolution of the two-dimensional image is degraded to ½ of the original horizontal resolution of the display device. When the components for the left eye and for the right eye are arranged alternately in the horizontal direction, it is necessary to switch and supply to the display device image signals for the left eye and image signals for the right eye alternately at an exact timing, with the period corresponding to 1H period/ (number of components in the horizontal direction). This requires a complicated display circuit. Further, in the case of the device disclosed in Japanese Patent Laying-Open No. 4-16092 shown in FIG. 11, stereoscopic image observation by a number of viewers is difficult, as the side lobes are removed.

When a stereoscopic image is to be observed by the display device disclosed in Japanese Patent Laying-Open No. 58-184929 shown in FIG. 13, it is necessary that polarizing transmission axes of polarizing plate 602a for the right eye arranged on the component 607 for the right eye and of the polarizing plate 602b for the left eye arranged for the component 605 for the left eye of a CRT or the like are exactly matched with polarizing transmission axes of polarizing plates 603a and 603b for the right and left eyes of the polarizing binocular which the viewer wears. When the axes are in exact matching, a stereoscopic image is observed. However, when the axes do not exactly match, as in the case when the viewer moves upward or downward, images for the right eye and for the left eye are mixed and observed by both eyes (cross talk), and thus stereoscope fails.

Here, the size Yud of a zone allowing stereoscopic view in which the viewer can move upward (a direction parallel to the lengthwise direction of the image screen) while observing a stereoscopic image normally in FIG. 13 is represented by the following equation (3). Here, P represents pitch of the display components, B represents width of a non-displaying portion (black matrix), L represents distance from the viewer to the display device, and d represents thickness of the glass layer in air.

$$Yud = B \times L / d \qquad (3)$$

For example, assume that a TFT liquid crystal display panel with 10.4 inch diagonal is used in place of a CRT, as a device for displaying images for the right eye and for the left eye in FIG. 13. It is assumed that the pitch P of one display component of TFT liquid crystal display panel is 0.33 mm, and the width B of the non displaying portion is 0.03 mm. A counter substrate of liquid crystal display panel corresponds to glass plate 604 as the face plate shown in FIG. 13. When thickness d1 of the counter substrate is assumed to be 1.1 mm and refractive index of the substrate is assumed to be 1.52, thickness d of counter substrate in air is 0.72 mm. Therefore, when the distance L from the viewer is 350 mm, the size of the zone allowing stereoscopic view and allowing movement in upward/downward direction is, according to the equation (3), Yud=14.5 mm. In other words, the viewer may move only by 7 mm in upward or downward direction from the center of the screen, and when this distance is exceeded, cross talk occurs.

U.S. Ser. No. 08/702,763 (Japanese Patent Laying-Open No. 9-068699) commonly owned by the applicant of the present application discloses a technique in which a retardation value is selectively set to a desired amount at an arbitrary position. The retardation value at other portions may be any value.

In Japanese Patent Laying-Open No. 62-135810 shown in FIG. 14, polarization layers 502a and 502b having partially different polarization directions are arranged inside the liquid crystal display panel so as to prevent generation of cross talk between left and right images. Here, polarization layers 502a and 502b are fabricated by a uniaxially rolled polyvinylalcohol. After polarization layers 502a and 502b are formed on the substrate, interconnection layers 503a and 503b as well as alignment films 504a and 504b are formed. However, heat resistance of polyvinylalcohol is not sufficient considering the process steps for manufacturing a liquid crystal panel known by those skilled in the art at present, uniaxial orientation of polyvinylalcohol is lost by the heat, and hence it is very difficult to provide a state of polarization necessary for stereoscopic imaging.

U.S. Pat. No. 5,537,144 employs a resist material for patterning the polarization layer or a retardation layer. This lowers efficiency in production. U.S. Pat. No. 5,537,144 employs polyvinylalcohol as a material for the polarization layer or the retardation layer. However, as already described, polyvinylalcohol has low heat resistance and it tends to swell when dipped in a solution. Therefore, optical characteristics such as polarization capability, retardation amount and so on are much susceptible to degradation through the steps of sintering, development and so on during patterning of the resist material. Therefore, when a micropolarization plate is fabricated by such a material or through such a method, it is difficult to obtain high-resolution images necessary for stereoscopic display.

SUMMARY OF THE INVENTION

Therefore, an object of the present invention is to provide an optical element and an image display device ensuring increased width in left/right direction of a zone allowing stereoscopic imaging.

Another object of the present invention is to provide an optical element and an image display device ensuring increased width in forward/rearward direction as well as in left/right direction of the zone allowing stereoscopic imaging.

A still further object of the present invention is to provide an optical element and an image display device ensuring increased width in left/right direction and in forward/rearward direction of the zone allowing stereoscopic imaging and simplifying structure of a circuit for image display.

An additional object of the present invention is to provide an optical element and an image display device facilitating suppression of cross talk generation in stereoscopic imaging.

A still further object of the present invention is to provide an optical element and an image display device ensuring increased width in upward/downward direction of the zone allowing stereoscopic imaging.

A still further object of the present invention is to provide an optical element and an image display device for stereoscopic imaging which can be fabricated in a simple manner.

A still further object of the present invention is to provide an optical element and an image display device which allow a plurality of viewers wearing prescribed binoculars to observe stereoscopic images without influence of position or posture.

A still further object of the present invention is to provide an optical element and an image display device allowing a plurality of viewers wearing prescribed binoculars to observe stereoscopic images without any influence of position or posture, and allowing a viewer not wearing a binocular observe an image with comparable resolution as the number of pixels formed on the image display device.

The optical element in accordance with the present invention includes: a transparent substrate having a main surface; a first birefringent photosensitive film arranged on a first region of the main surface such that a slow axis or a fast axis matches a prescribed first direction; and a second birefringent photosensitive film arranged on a second region different from the first region on the main surface such that the slow axis or the fast axis matches in a prescribed second direction different from the first direction.

As the first birefringent photosensitive film and the second birefringent photosensitive film are provided, the directions of the fast axis or the slow axis are made mutually different in the first and second regions. By placing the first and second regions at positions corresponding to the components for the right and left eyes, respectively, it becomes possible to emit circular polarization with the direction of rotation opposing to each other from the components for the right and left eyes of the display device. Therefore, it becomes possible for a viewer wearing a circular polarizing binocular, to observe a stereoscopic image without any influence of the position or posture.

Preferably, the first and second directions are different from each other in the range of 90°±20°, and more preferably, in the range of 90°±10°. More preferably, the first birefringent photosensitive film and the second birefringent photosensitive film have retardation values within the range of 90 nm to 800 nm. More preferably, the retardation values of the first birefringent photosensitive film and the second birefringent photosensitive film are substantially equal to quarter (¼) wavelength. More specifically, the retardation values may be within the range of ¼ wavelength ±5%. Here, the "wavelength" means the wavelength" in visible light spectrum.

By these features, separation of pixels for the left eye and for the right eye by polarization can be enhanced. Further, chromaticity of visual light beams forming images can be adjusted.

According to another aspect of the present invention, the method for manufacturing an optical element includes the steps of: preparing a first transparent substrate having a main surface; forming a first photosensitive film having a first birefringence on a first region of the main surface such that a slow axis or a fast axis of the first photosensitive film is arranged in a prescribed first direction; and forming a second photosensitive having a second birefringence different from the first birefringence on a second region different from the first region on the main surface, such that the slow axis or the fast axis of the second photosensitive film is arranged in a second direction different from the first direction.

Preferably, the step of forming the first photosensitive film includes the steps of: forming a photosensitive film having a first birefringence on a main surface such that the slow axis or the fast axis of the photosensitive film having the first birefringence is arranged in a first direction; and patterning the photosensitive film having the first birefringence formed on the main surface to a first region by photolithography.

More preferably, the step of arranging the second photosensitive film includes the steps of: forming a photosensitive film having a second birefringence on the first photosensitive film such that the slow axis or the fast axis is aligned with the second direction; and patterning the photosensitive film having the second birefringence to a second region by photolithography.

In this manner, it becomes possible to manufacture an optical element having a plurality of regions of different slow axis and fast axes on a substrate in a precise pattern and with a high efficiency.

The step of arranging the second photosensitive film may include the steps of: preparing a second transparent substrate having a main surface; forming the second photosensitive film at a position corresponding to the second region when the main surfaces of the first and second transparent substrates are superposed, such that the slow axis or the fast axis of the second photosensitive film is aligned with the second direction; and adhering the first and second transparent substrates such that main surfaces of the substrates oppose to each other.

In this manner, it becomes possible to manufacture in a simple manner, an optical element having a plurality of regions of different slow axis and fast axes on a substrate with precise pattern and high efficiency.

According to a still another aspect, the present invention provides-an image display device having a display screen on which a plurality of pixels are arranged. The display screen includes a first region and a second region different from the first region, and the plurality of pixels are classified into those belonging to the first region and those belonging to the second region. The image display device includes an image forming device for forming an image by displaying a plurality of pixels on the display screen, and an optical element provided relative to the display screen for differentiating states of polarization of beams emitted from the first region and beams emitted from the second region. The optical element includes a transparent substrate having a main surface, a first birefringent photosensitive film arranged on a first region of the main surface corresponding to the first region of the display screen such that a slow axis or fast axis thereof is aligned with a prescribed first direction, and a second birefringent photosensitive film arranged on a second region of the main surface corresponding to the second region of the display screen such that the slow axis or fast axis is aligned with a prescribed second direction different from the first direction.

As the first and second birefringent photosensitive films are provided, the directions of the slow axis or the fast axis are different from each other in the first and second regions. By placing the first and second regions at positions corresponding to the components for the right eye and for the left eye of the image display device, respectively, it becomes possible to emit circular polarization with the direction of rotation opposite to each other from the components for the right eye and for the left eye of the image display device. Accordingly, it becomes possible for a viewer wearing a circular polarizing binocular, to observe a stereoscopic image displayed by the image display device, without any influence of position or posture.

Preferably, the image forming device includes a liquid crystal display panel having a display screen. The optical element is adhered to the liquid crystal display panel such that the first and second birefringent photosensitive films are in contact with the display screen of the liquid crystal display panel.

Alternatively, the liquid crystal display panel may include two transparent substrates arranged oppose to each other, a liquid crystal sealed between the two transparent substrates, and a circuit for driving the liquid crystal formed between the two transparent substrates. The optical element may be arranged between one of the transparent substrates and the liquid crystal.

Since the distance between the image forming device and the optical element is short, parallax can be reduced, and the range allowing stereoscopic imaging is made wider.

Preferably, the liquid crystal display panel may include first and second transparent substrates arranged such that main surfaces oppose to each other, a first circular polarization element provided on a rear surface of the first transparent substrate, a liquid crystal sealed between the first and second transparent substrates, a circuit for driving the liquid crystal formed between the first and second transparent substrates, and a second circular polarization element provided on a rear surface of the second transparent substrate. The optical element is attached on the second circular polarization element such that the first and second birefringent photosensitive films are in contact with the second circular polarization element. The image display device may further include a microlens provided for each of the first and second regions, provided on the optical element.

Preferably, the pixels are arranged in a matrix of a plurality of rows and a plurality of columns, the first region may include pixels belonging to the odd-numbered ones of the plurality of rows, and the second region may include pixels belonging to the even-numbered ones of the plurality of rows.

The microlens may include a plurality of cylindrical lens provided corresponding to respective rows. The plurality of cylindrical lenses may form one lenticular sheet. More preferably, a pitch P1 of the arrangement of the plurality of cylindrical lenses is selected to satisfy the following equation:

$$P1 = P \cdot L / (d+L)$$

where P represents pitch of the arrangement of pixels in the column direction, d represents distance from a image display plane to a plane where the cylindrical lenses are arranged in air, and L represents distance from the viewer to the plane where the cylindrical lenses are arranged, respectively.

By the image display device, since cylindrical lenses are arranged corresponding to respective rows, the resolution of images viewed by the viewer is not degraded from the resolution of images displayed on the display screen, even when the viewer does not wear circular polarization binocular.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2A to 2F are illustrations showing steps of manufacturing the optical element in accordance with the first embodiment of the present invention.

DESCRIPTION OF THE PREFERRED EMBODIMENTS (First Embodiment)

An embodiment in which an optical element having slow axis of different directions is fabricated by arranging two birefringent photosensitive films on a substrate with directions of slow axis made different from each other, will be described.

Figure 1:
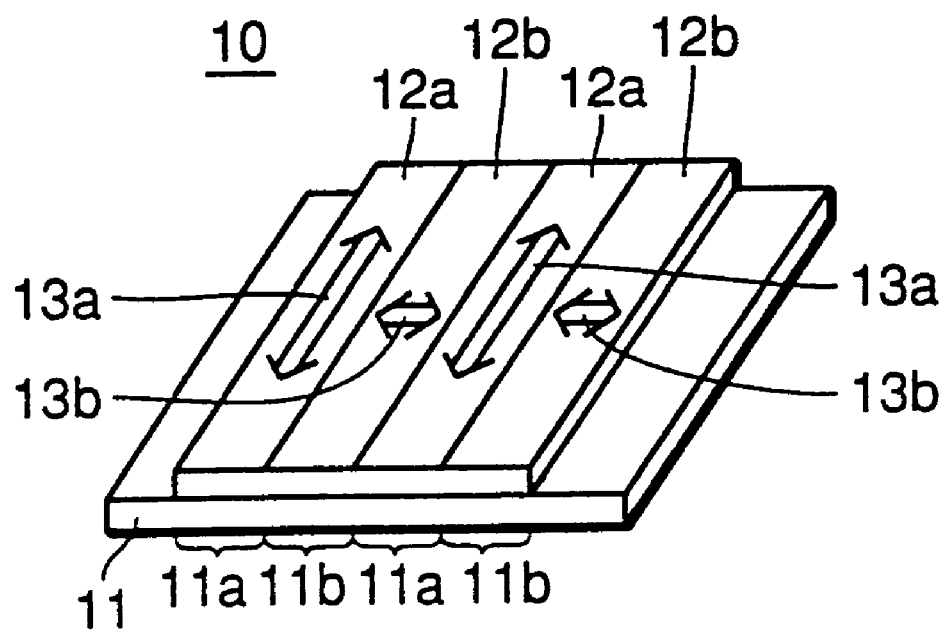
FIG. 1 is a perspective view showing an optical element in accordance with a first embodiment of the present invention.

Referring to FIG. 1, in an optical element 10 of the present embodiment, a retardation layer 12a formed of a birefringent photosensitive film is arranged in the direction of a first slow axis 13a on a first region 11a of a transparent substrate 11 such as glass. A retardation layer 12b formed of a birefringent photosensitive film is arranged in a direction of a second slow axis 13b on a second region 11b. The first slow axis 13a and the second slow axis 13a are arranged orthogonal (90°) to each other.

The optical element in accordance with the present invention is fabricated in the following manner.

Figure 2A:
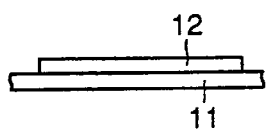
Figure 2A:
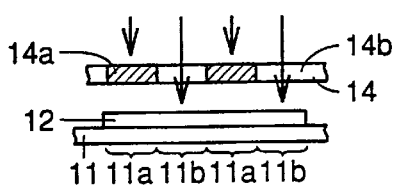
Figure 2A:
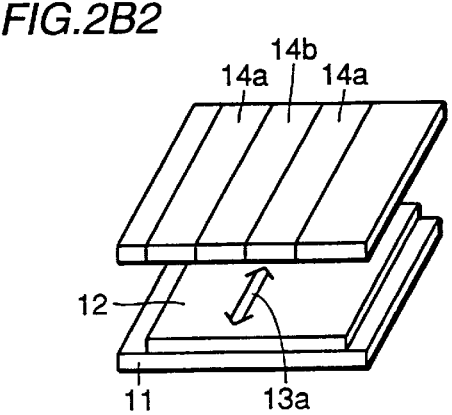

First, referring to FIG. 2A, a photosensitive film 12 is adhered on transparent substrate 11. At this time, the substrate may be preheated. At the time of adhesion, photosensitive film 12 may be pressed onto transparent substrate 11 for pressure contact. When preheated or pressed, adhesion of transparent substrate 11 with photosensitive film 12 is improved.

A photosensitive film disclosed in a patent application (Japanese Patent Laying-Open No. 9-068699) filed by the inventors of the present invention, incorporated by reference above, may be used as photosensitive film 12. More specifically, first, a birefringent photosensitive film may be used. By using such a photosensitive film, a region having phase difference can selectively be generated. Second, a photosensitive film in which molecules are arranged in uniaxial direction or biaxial direction may be used. Such a photosensitive film comes to have birefringence when molecules constituting the photosensitive film are oriented. Third, a negative photosensitive film formed using as a raw material, a photopolymerization initiator of photopolymer and photomonomer may be used. Such a photosensitive film can be oriented by rolling and, when irradiated with light, photopolymerization of the photopolymer and photomonomer takes place in the irradiated region. Fourth, a positive photosensitive film formed of a photo-degradable polymer or of a photosensitive agent and polymer material for holding the photosensitive agent, may be used. Such a photosensitive film can be oriented by rolling and when irradiated with light through a photomask or the like, photo degradation of the polymer material is possible at the irradiated region. Fifth, a photosensitive film having at least one surface covered by a polymer sheet, a polymer film or paper may be used. Such a photosensitive film can be rolled even if it has adhesiveness. The first to fifth photosensitive films may be fabricated by rolling in uniaxial, biaxial or three or more axial directions, so that molecules constituting the film are oriented in the rolling direction. In the present embodiment, photosensitive films having the retardation value of 130 nm are used as the first to fifth photosensitive films. This value substantially satisfies the $\lambda/4$ condition.

It should be noted that the retardation value is substantially equal to a quarter of 550 nm, the wavelength of the light most sensible to human eyes. Here, the retardation value may be within the range of 400–800 nm and equal to $\lambda/4\pm0.1\lambda$, preferably substantially equal to $\lambda/4$. If the retardation value is outside the range of $\lambda/4\pm0.1\lambda$, the crosstalk will increase or the three-D view will be obtained only in limited area.

Referring to FIGS. 2B1 and 2B2, photosensitive film 12 is arranged on first region 11a of transparent substrate 11 by photolithography. At this time, if photosensitive film 12 is positive, photosensitive film 12 is irradiated with light through a photomask 14 arranged such that shielding portion 14a thereof approximately matching the first region 11a. When the film is negative, photosensitive film 12 is irradiated with light through photomask 14 arranged such that light transmitting portion 14b thereof approximately matches the first region 11a. Photomask 14 has stripes of shielding portions 14a and transmitting portions 14b, both having the width of 300 μm each. Photomask 14 is arranged such that longitudinal direction of the stripes is aligned with the first slow axis 13a of photosensitive film 12a.

Figure 2C:
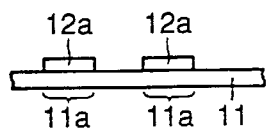

Thereafter, as shown in FIG. 2C, development is performed using a prescribed developer, and phase difference layer 12a formed of photosensitive film 12 is formed on first region 11a.

Figure 2D:
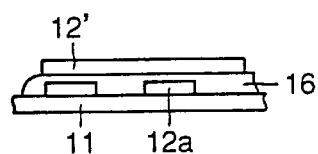
Figure 2D:
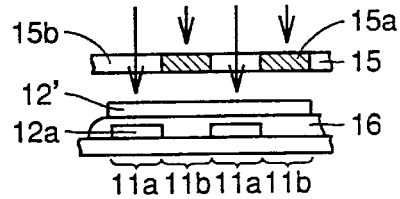
Figure 2D:
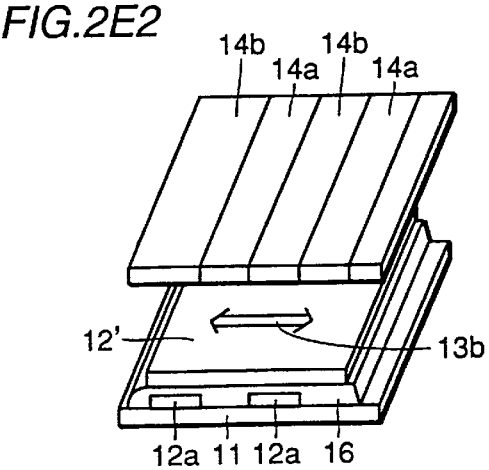
Figure 2F:
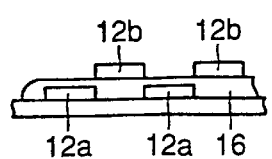

Thereafter, retardation layer 12b is formed on the second region 11b in the similar manner. At this time, when it is desired to planarize a surface of retardation layer 12a, a planarizing layer 16 may be formed by a transparent resin material, as shown in FIG. 2D.

Thereafter, photolithography is performed as shown in FIGS. 2E1 and 2E2. Here, photosensitive film 12' is arranged such that the second slow axis 13b intersects orthogonally (90°) with the first slow axis 13a of retardation layer 12a. Photomask 15 used here has stripes of shielding portions 15a and transmitting portions 15b both having the width of 300 μm each. When photosensitive film 12' is positive, photomask is arranged such that shielding portion 15a matches the second region 11b, and when photosensitive film 12' is negative, photomask is arranged such that transmitting portion 15b matches the second region 11b.

Optical element 10 is fabricated in this manner.

The principle of the optical element will be described. The birefringent photosensitive film for forming the optical element is a birefringent film having phase difference prepared by uniaxially rolling a photosensitive film. Here, in the birefringent film, the direction in which organic polymer material is axially rolled is referred to as a slow axis or fast axis and, generally, referred to as axial direction.

Change in the state of polarization when linearly polarized light beam is incident on the birefringent film from the direction of an angle θ with respect to the axial direction of the birefringent film will be described with reference to FIG. 15.

First, electric field components of the incident lineally polarized light beam are divided into components parallel to the axial direction and components perpendicular to the axial direction of the birefringent film. In the birefringent film, respective velocity components are represented as $v\perp=c\perp/n\parallel$ and $v\parallel=c\parallel/n\perp$. Here $n\parallel$ it represents refractive index in the axial direction, and $n\perp$ represents refractive index in the direction perpendicular to the axial direction (where $n\parallel>n\perp$). Further, $c\parallel=c\times\cos\theta$, $c\perp=c\times\sin\theta$ (where c represents velocity of luminous flux in vacuum).

Figure 15:
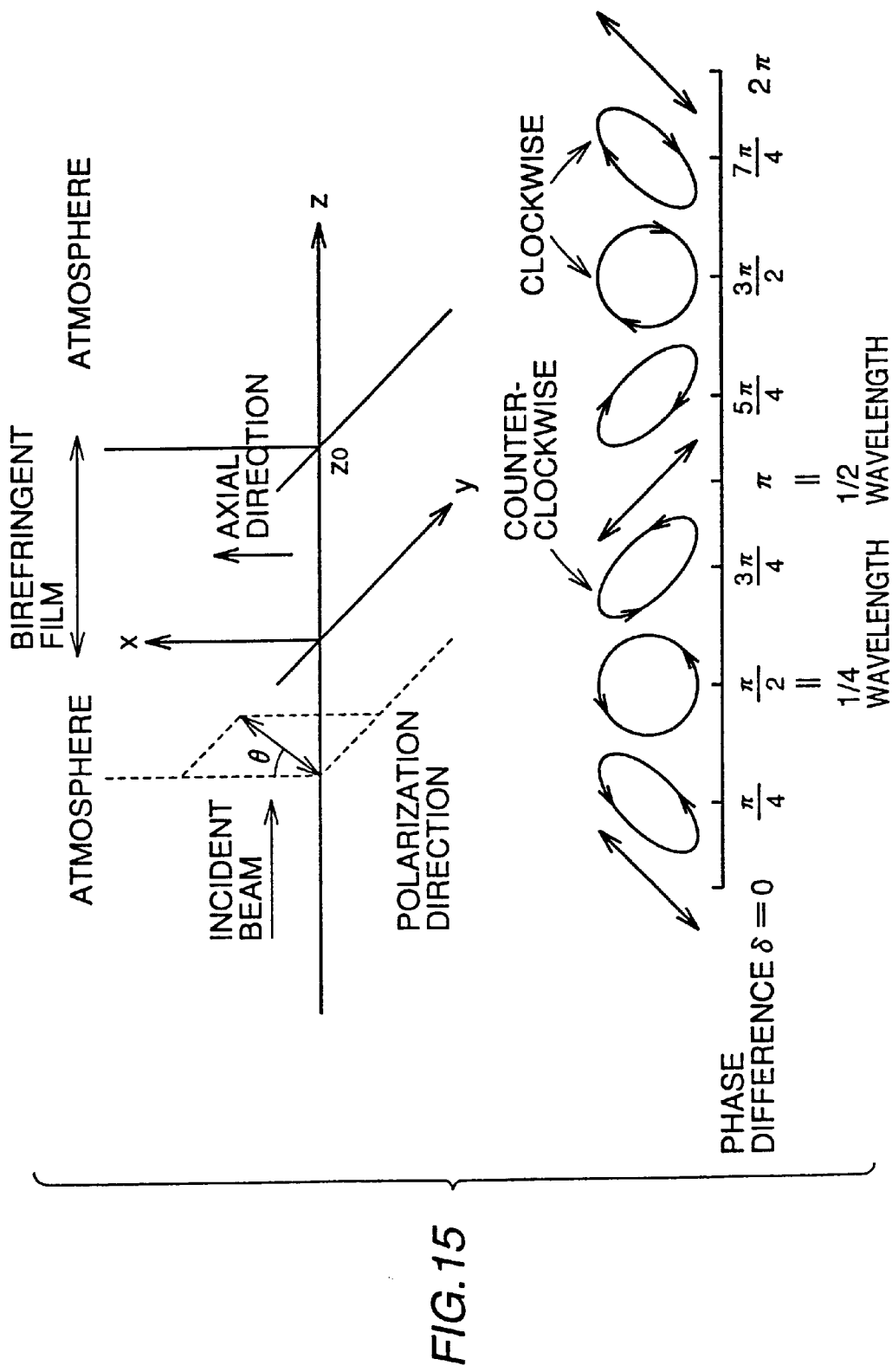
FIG. 15 shows a principle how an incident linear polarization is converted to two elliptically polarized beams or two circularly polarized beams of different directions of rotation in the optical element of the present invention.

Therefore, when we consider light velocity in z direction shown in FIG. 15, the electric field component parallel to the slow axis of the birefringent film is slower than the electric field component in the perpendicular direction. As a result, change in electric field strength occur differently in x and y directions shown in FIG. 15, whereby the incident linearly polarized light beam is subjected to elliptical polarization or circular polarization.

For example, when phase difference of the birefringent film is set to about quarter wavelength and a linearly polarized light beam polarized in a direction of θ=45° with respect to the axial direction is directed, the state of polarization changes to counterclockwise circular polarization. When a linearly polarized light beam polarized in a direction of θ=45° with respect to the axial direction is directed, the state of polarization changes to circular polarization in opposite direction, that is, to clockwise circular polarization.

When the birefringent film is set to half wavelength (½), the state of polarization changes to linear polarization polarized in a direction offset by an angle 2θ from the incident linearly polarized light beam. Here, if θ=45°, the incident linearly polarized light beam is changed to linearly polarized light beam offset by 2θ=90°, that is, perpendicular to the incident linearly polarized light beam.

When the phase difference is neither quarter wavelength nor half wavelength, the incident linearly polarized light beam is subjected to elliptical polarization.

More specifically, when quarter wavelength plates are patterned to stripes and arranged with the axial directions crossing orthogonal to each other as in the optical element of the present invention, and a linearly polarized light beam is directed at an angle θ=45° to the first quarter wave plate, then a linearly polarized light beam will be incident at an angle of θ=−45° to the second quarter wave plate as a result. Consequently, counterclockwise polarization occurs in the first region, while clockwise polarization occurs in the second region.

In the first embodiment, retardation layer 12a in the first region 11a and retardation layer 12b of the second region 11b are set to have slow axes crossing orthogonally with each other. However, the directions are not limited thereto. The angle may be in the range of 90°±20°, and preferably within the range of 90°±10°. The same applies to the following embodiments.

The optical element in accordance with the first embodiment may be modified to a circular polarization element, by providing a polarizing film thereon. In that case, polarization transmission axis of the polarizing film is arranged at an angle of 45°±10° with respect to the slow axis or fast axis of the optical element. The same applies to the following embodiments.

In the first embodiment, retardation layers 12a and 12b are superposed on transparent substrate 11. Alternatively, retardation layer 12a may be formed on one surface of transparent substrate 11 and retardation layer 12b may be formed on the other surface of the substrate. Further, in the first embodiment, optical element having different slow axes has been described. An optical element having different fast axes may be fabricated through similar steps as in the first embodiment, by arranging two birefringent photosensitive films on one transparent substrate 11 with the fast axes made different from each other.

(Second Embodiment)

In the present embodiment, a first birefringent photosensitive film is arranged on one transparent substrate, a second birefringent photosensitive film is arranged on another transparent substrate, and the substrates are arranged with the slow axes made different from each other. Further, the two substrates are opposed to each other, thus providing an optical element having different slow axes.

Figure 3:
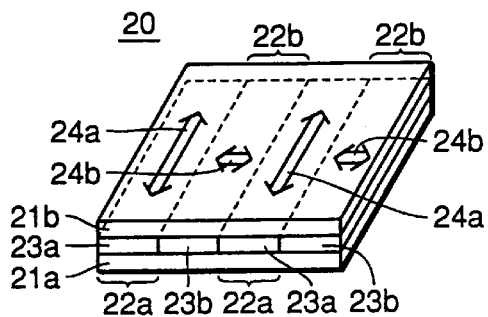
FIG. 3 is a perspective view showing an optical element in accordance with the second embodiment of the present invention.

Referring to FIG. 3, a retardation layer 23a formed of a birefringent photosensitive film is arranged aligned in the direction of a first slow axis 24a, on a first region 22a of a first transparent substrate 21a of glass, for example. A retardation layer 23b formed of a birefringent photosensitive film is arranged aligned with the direction of a second slow axis 24b on a second region 22b on a second transparent substrate 21b formed of glass, for example. Here, the first and second slow axes 24a and 24b are arranged orthogonal to each other (90°). Transparent substrates 21a and 21b are superposed such that surfaces on which retardation layers 12a and 12b are formed oppose to each other.

The optical element in accordance with the present embodiment is fabricated in the following manner.

Figure 4A:
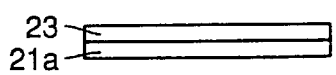
FIGS. 4A to 4G are illustrations showing the steps of manufacturing the optical element in accordance with the second embodiment of the present invention.

First, referring to FIG. 4A, a photosensitive film 23 is adhered to first transparent substrate 21a. Any film that is listed as the first to fifth photosensitive films in the first embodiment 1 may be used as photosensitive film 23. In the present embodiment, a film having the retardation value of 130 nm is used so as to satisfy the λ/4 condition. At this time, the substrate may be preheated. Further, for adhesion, photosensitive film 23 may be pressed to be in contact with transparent substrate 21a. When preheated or pressed, adhesion of transparent substrate 21a with photosensitive film 23 is improved.

Figure 4B:
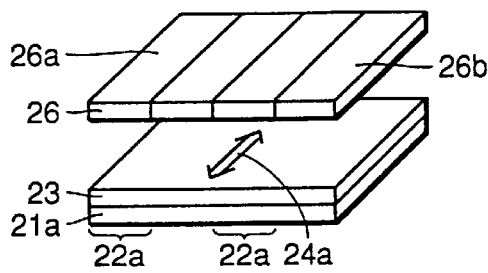

Referring to FIG. 4B, photosensitive film 23 is arranged on the first region 22a of transparent substrate 21a by photolithography. At this time, if photosensitive film 23 is positive, photosensitive film 23 is irradiated with light through a photomask 26 arranged such that shielding portions 26a are approximately aligned with the first region 22a. If the photosensitive film 23 is negative, photosensitive film 23 is irradiated with light through photomask 26 arranged such that light transmitting portions 26b are approximately aligned with the first region 22a. Photomask 26 has stripes of shielding portions 26a and transmitting portions 26b both having the width of 300 μm each. Photomask 26 is arranged such that longitudinal direction of the stripes matches the first slow axis 24a of photosensitive film 23.

Figure 4C:
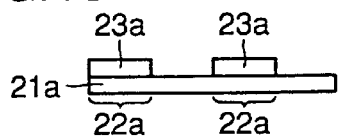

After development using a prescribed developer, retardation layer 23a formed of the photosensitive film 23 is formed on the first region 22a, as shown in FIG. 4C.

Figure 4D:
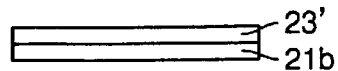
Figure 4E:
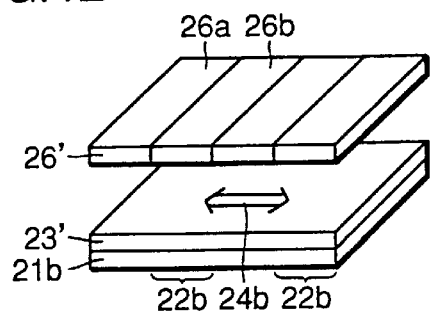
Figure 4F:
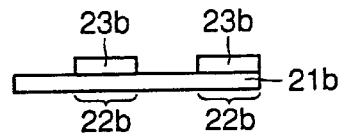

Referring to FIGS. 4D to 4F, in the similar manner, retardation layer 23b is formed on the second region 22b on the second transparent substrate 21b. At this time, photosensitive film 23' is arranged such that the second slow axis 24b is orthogonal to (90°) the first slow axis 24a of retardation layer 23a. Here, when the photosensitive film is positive, photosensitive film 23' is irradiated with light through a photomask 26' arranged such that shielding portions 26b are approximately aligned with the first region 22b. When the photosensitive film is negative, photosensitive film 23' is irradiated with light through photomask 26' arranged such that light transmitting portions 26a are approximately aligned with the first region 22b. Photomask 26' has stripes of light transmitting portions 26a and shielding portions 26b both having the width of 300 μm each, and photomask 26 is arranged such that the longitudinal direction of the stripes is orthogonal to the second slow axis 24b of photosensitive film 23'.

Figure 4G:
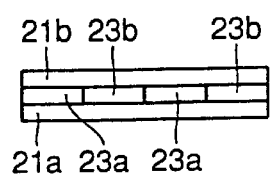

Referring to FIG. 4G, the first and second transparent substrates 21a and 21b fabricated in this manner are superposed such that retardation layers 23a and 23b oppose to each other. At this time, the substrates are superposed such that regions of retardation layers 23a and 23b are not overlapped. More specifically, the substrates are superposed such that phase plates 23a and 23b are arranged alternately. When it is desired to planarize surfaces of retardation layers 23a and 23b, a planarizing layer (not shown) may be formed by a transparent resin material.

Optical element 20 is fabricated in this manner.

(Third Embodiment)

In the third embodiment, an image display device providing both two-dimensional and three-dimensional images by applying the optical element described in the first or second embodiment above to a liquid crystal display, will be described.

Figure 5:
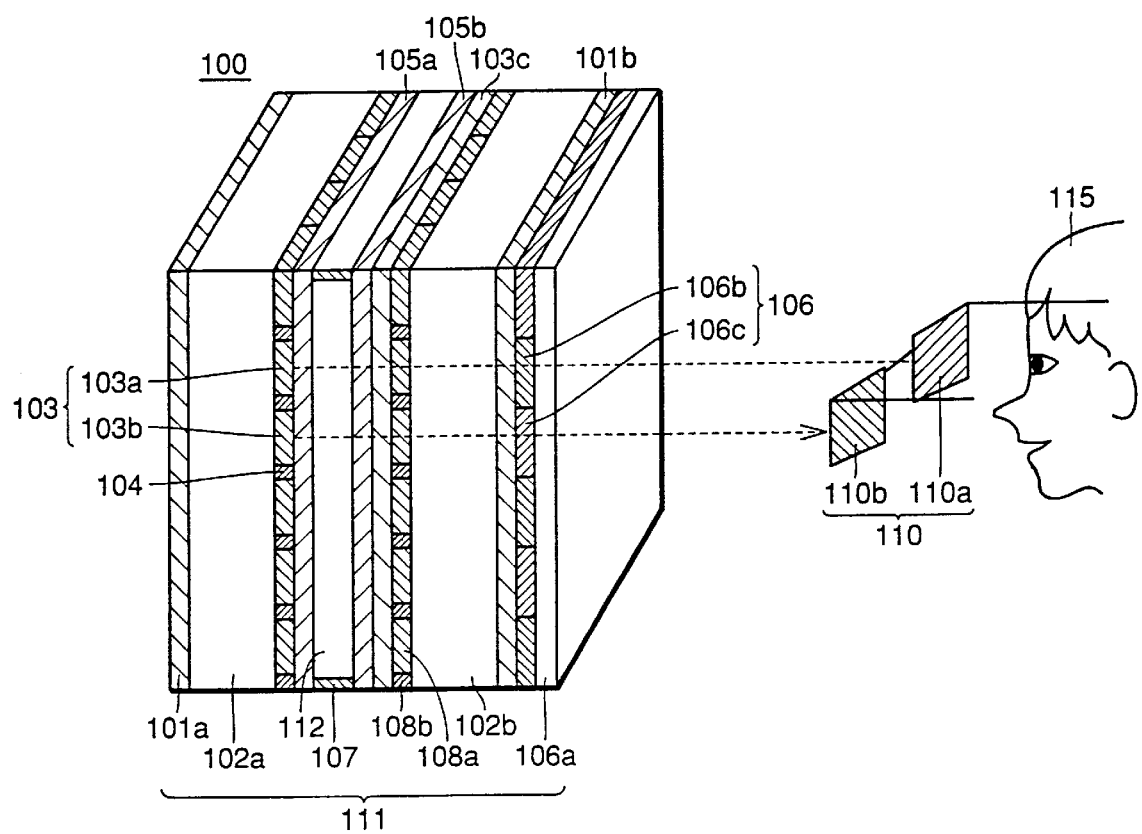
FIG. 5 shows a structure of a image display device in accordance with a third embodiment of the present invention.

Referring to FIG. 5, structure and method of fabrication of a liquid crystal display 100 used in an image display device used both for two-dimensional and three-dimensional displays fabricated in accordance with the present embodiment will be described. On a glass substrate 102a, scanning lines, signal lines, pixel electrodes (all not shown), and TFT elements 104 are formed. A pixel electrode is provided one for each of the components 103 arranged in the matrix of rows and columns. Scanning lines are provided along the horizontal direction of the display screen of liquid crystal display panel 111 such that each scanning line corresponds to one row of pixels 103. Signal lines are formed orthogonal to scanning lines such that each signal line corresponds to one column of pixels 103. Scanning lines, signal lines and pixel electrodes are connected by TFT elements 104. Scanning lines, signal lines, TFT elements 104 and pixel electrodes may be formed in accordance with any method. In the present specification, the direction parallel to the scanning lines will be referred to as row direction, and the direction parallel to signal lines will be referred to as column direction.

Pixels 103 arranged in a matrix are divided into a group 103a for right eye pixels and a group 103b for left eye pixels, in turn, row by row of pixels. Therefore, groups 103a and 103b for the right eye and for the left eye are arranged alternately one scanning line by one scanning line.

Thereafter, an alignment film 105a is formed entirely over glass substrate 102a on which TFT elements 104 are formed. Alignment film 105a is formed by applying and sintering an organic polymer material such as polyimide or a precursor thereof solved in an organic solvent represented by γ-butyrolactone, N-methylpyrolidone or xylene, on the entire surface of substrate 102a by spin coating, and thereafter sintering. In this manner, substrate on the TFT side is completed.

On glass substrate 102b of the opposing side, formed are a color filter 108a and a black matrix 108b for shielding light to TFT element 104 formed on glass substrate 102a and for preventing light leakage from spaces between scanning lines, signal lines and a pixel electrodes. Color filter 108a and black matrix 108b may be formed by any method. In the third embodiment, color filter 108a is formed such that filters of red (R), green (G) and blue (B) constituting color filter 108a form stripes parallel to the signal lines and that R, G, and B are arranged periodically in the direction of the scanning lines (horizontal direction on the image screen). Further, black matrix 108b is formed in a lattice form to surround each pixel. Thereafter, on color filter 108a, transparent conductive film used as transparent electrode 103c, for example, ITO (Indium-Tin Oxide) is formed entirely over substrate 102b by sputtering, for example, and further thereon, an alignment film 105b is formed in the similar manner as alignment film 105a. In this manner, the counter substrate is formed.

Thereafter, the TFT side substrate and counter substrate completed in the above described manner are subjected to rubbing treatment. A spacer for keeping constant the distance between both substrates is scattered uniformly over the entire substrates, and periphery of the substrates are sealed by a sealant 107, and thus the substrates are adhered. Liquid crystal is introduced in vacuum between the substrates, and thus liquid crystal layer 112 is formed. In this manner, liquid crystal display panel 111 is completed. In the third embodiment, display mode of liquid crystal display panel 111 is TN (Twisted Nematic) liquid crystal display mode.

A polarizing film 101b having uniform polarization axis over the entire surface is provided adjacent to the display surface side of glass substrate 102b of the thus fabricated liquid crystal display panel 111. Thereafter, optical element 106 fabricated in accordance with the first or second embodiment is arranged on polarizing film 101b. At this time, quarter wave plates 106b and 106 constituting optical element 106 are formed on substrate 106a, and quarter wave plates 106b and 106c are formed such that the plates have stripes each of which having a width approximately the same as the width of the pixel, and that the slow axis (or fast axis) is offset by 90° scanning line by scanning line. At this time, slow axes (or fast axes) of quarter wave plates 106b and 106c are arranged offset by 45° in opposite direction, from the direction of the polarization transmission axis direction of polarizing film 101b. Thus the light beam emitted from liquid crystal display panel 111 and passing through polarization film 101b and optical element 106 is turned to circularly polarized light beam of which direction of rotation reversed alternately at every column of pixels. It is possible for a viewer 115 to observe a three-dimensional image by wearing a polarization binocular 110 having circular polarization films 110a and 110b corresponding to respective directions of rotation.

In the third embodiment, offset of directions of the slow axis (or fast axis) of quarter wave plates 106b and 106c constituting optical element 106 is 90° (perpendicular). However, the offset may not strictly be 90° (perpendicular), and the offset may be any angle within the range of 90°±10°.

Further, in the third embodiment, offset between the direction of the polarization transmitting axis of polarization film 101b and the direction of slow axis (or fast axis) of quarter wave plates 106b and 106c constituting optical element 106 is 45°. However, the angle is not strictly limited to 45°, and it may be any angle within the range of 45°±10°.

Thereafter, polarizing film 101a of which axis of polarization transmission is uniform over the entire surface is arranged adjacent to TFT side substrate 102a of liquid crystal display panel 111, such that the polarization transmission axis is orthogonal to the polarization transmission axis of polarization film 101b. Thus the image display device of the third embodiment is completed.

In the third embodiment, one row of pixels arranged parallel to the scanning lines constitute a pixel group providing an image for one eye (for example, left eye), and the next row of pixels constitute a pixel group providing an image corresponding to the other eye (for example, right eye), as described above. Further, optical element 106 is arranged such that stripes of quarter wave plates 106b and 106c correspond alternately to the scanning lines on the entire surface of the display element, whereby images for the left eye are separated from the images for the right eye. Since pixels of the liquid crystal display panel are arranged such that the pixel group for the left eye and pixel group for the right eye appear alternately row by row, it is possible to alternately switch and supply the image signals for the left eye and the image signals for the right eye at every scanning line. Therefore, structure and driving method of a driving circuit for the signal lines can be simplified.

Further, light emitted from the pixel group for the left eye and the pixel group for the right eye are converted to left and right (counterclockwise and clockwise) circular polarization by optical element 106. Therefore, it is possible for a number of viewers to observe a three-dimensional image by wearing polarization binoculars 110 provided with circular polarization films. Further, a three-dimensional image can still be observed even when a viewer 115 inclines his or her face.

Further, two-dimensional images can be observed when the viewer does not wear the polarization binocular 110.

In the third embodiment, a circular polarization element prepared by arranging a polarization film on optical element 106 fabricated in accordance with the first or second embodiment above may be employed. In that case, polarization film 101*b* is not necessary. This is the same in the following embodiments.

In the third embodiment, an active matrix type liquid crystal display panel is used as liquid crystal display panel 111. However, display means presenting images for the left eye and for the right eye is not limited thereto. A simple matrix type liquid crystal display panel, a spontaneous emitting display such as an EL (Electro Luminescence), a CRT or a plasma display, or a plasma address liquid crystal display panel may be used to obtain the same effects.

In the third embodiment, a TN liquid crystal is used as the liquid crystal display panel and display is given in TN (Twisted Nematic) mode. However, the present invention is not limited thereto. The present invention may be used in any display mode such as STN (Super Twisted Nematic) mode, ferroelectric liquid crystal mode, anti-ferroelectric liquid crystal mode, polymer dispersed type liquid crystal mode, axis-symmetrical alignment mode, electrically controlled birefringence mode, hybrid field effect mode, In-Plane Switching Mode, phase-transition mode employing smectic liquid crystal having electro clinic effect, dynamic diffusion mode, guest-host mode or a liquid crystal complex film. Those skilled in the art may appropriately select the desired display mode.

In the third embodiment, R, G and B filter portions of the color filter are arranged as stripes. However, these filter portions may be arranged in delta arrangement. At this time, shapes of quarter wave plates 106*b* and 106*c* constituting optical element 106 may be any shape that matches either one of the pixel groups for the left eye and the right eye, regardless of the shape of the color filter.

In the third embodiment, one row of pixels arranged in a direction parallel to the scanning lines is specified as a pixel group for the left eye or right eye. However, the present invention is not limited to such grouping. One column of pixels arranged parallel to the signal lines may be specified as a pixel group for the left eye or for the right eye. In that case, however, quarter wave plates 106*b* and 106*c* constituting optical element 106 should be formed such that the size thereof is approximately the same as the size of the pixel, alternately in the signal line direction.

As for the method of arranging optical element 106 on polarizing film 101*b*, when substrate 106*a* for optical element 106 is formed of a transparent material such as glass or plastic, substrate 106*a* and polarizing film 101*b* may be arranged in contact with each other. Optical element 106 arranged in this manner may be adhered on polarizing film 101*b* by an adhesive or paste. Such an adhesive or paste may be cured by optical irradiation or heating, as needed.

Further, a retarder film in which direction of principal indices of refraction of a refractive index ellipsoide are inclined with respect to the normal direction of the surface, such as proposed in Japanese Patent Laying-Open No. 6-75116, may be arranged between polarizing film 101*b* and glass substrate 102*b*, so as to prevent degradation of contrast derived from incorrect achromaticity or reversed image phenomenon of liquid crystal display device. Description of Japanese Patent Laying-Open No. 6-75116 is incorporated herein by reference. Further, a retarder film having an arbitrary phase difference may be arranged. Especially when the liquid crystal display panel III is in the STN mode, a retarder film having an arbitrary phase difference may additionally be arranged between glass substrate 102*a* and polarizing film 101*a*. This enables viewing angle compensation and color compensation.

(Fourth Embodiment)

In the fourth embodiment, an image display device serving as both two-dimensional and three-dimensional displays in which the optical element and circular polarization element described in the first or second embodiments are applied to a liquid crystal display will be described.

Figure 6:
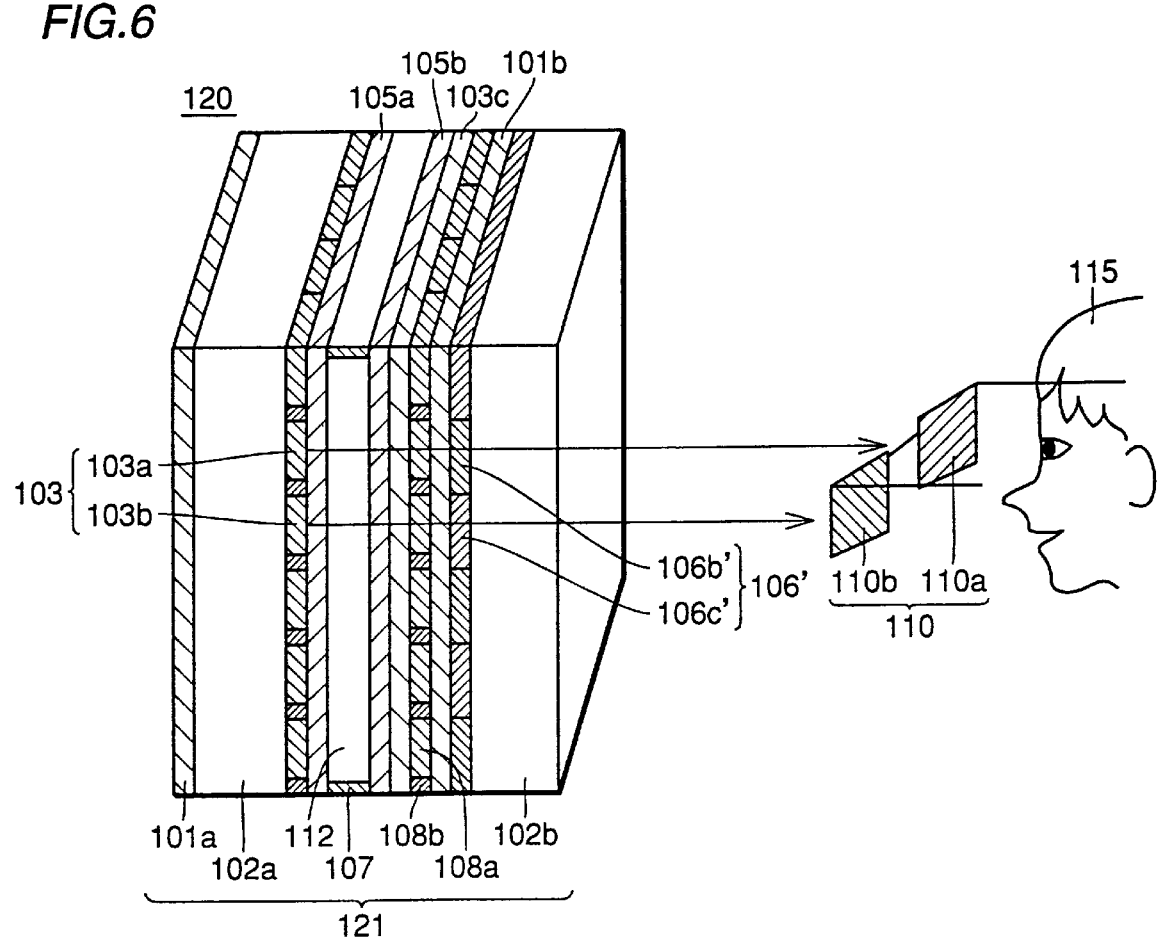
FIG. 6 shows a structure of a image display device in accordance with a fourth embodiment of the present invention.

Referring to FIG. 6, a liquid crystal display 120 as an example of an image display device used for displaying both two-dimensional and three-dimensional images fabricated in accordance with the present embodiment includes a liquid crystal display panel 121. The structure and method of fabrication thereof are similar to those of liquid crystal display panel 111 described with reference to the third embodiment shown in FIG. 5. Therefore, portions corresponding to those of the third embodiment are denoted by the same reference characters and description thereof is not repeated here.

The fourth embodiment is characterized in that an optical element 106' described in the first or second embodiment is formed on the side of the display medium of the opposing side glass substrate 102*b*. Accordingly, the display pixel portion comes close to the phase difference region, and therefore, the zone allowing stereoscopic imaging can be made wider.

Figure 17:
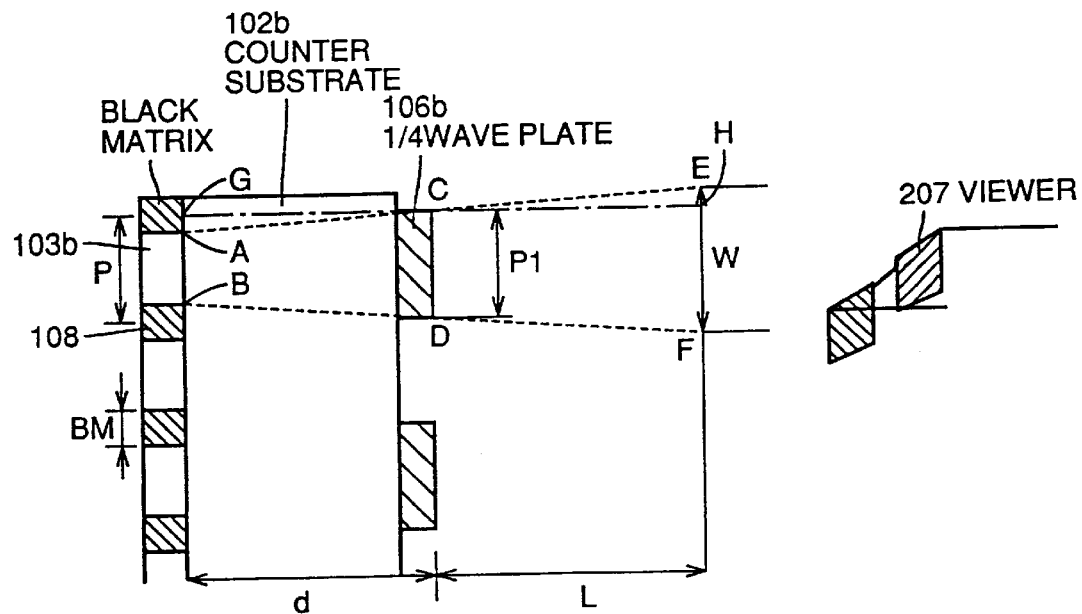
FIG. 17 is an illustration showing the zone allowing stereoscopic imaging in the image display device in accordance with a fourth embodiment.
Figure 18:
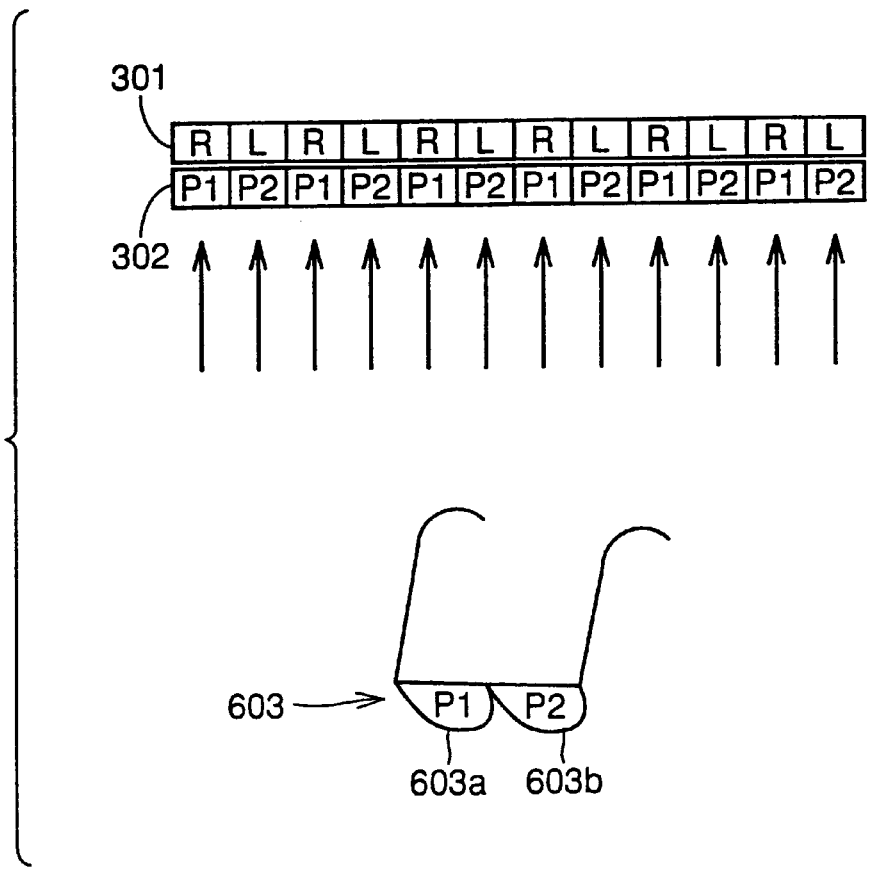
FIG. 18 schematically shows a structure of a stereoscopic image display device in accordance with a third conventional Polarizing Binocular Stereoscopic Imaging.

The reason will be described with reference to FIG. 17. Here, it is assumed that portion 106*b* for forming quarter wave plate region is patterned such that light beam emitted from a pixel 103*b* for the left eye passes through the optical element or the portion 106*b* for forming the quarter wavelength plate constituting the circular polarization element. For simplicity, the polarization film, the alignment film and so on are not shown. Here, the pitch between pixels is represented by Pt width of the black matrix is represented by BM, the pitch of quarter wave plate by P1, distance from a plane on which the pixels are formed to an upper surface of quarter wave plate forming portion by d, the distance from the viewer to the upper surface of quarter wave plate forming portion by L and the zone allowing stereoscopic imaging by W.

Here, in order that the beam emitted from the pixel for the left eye is observed by the left eye of the viewer through a circular polarization binocular worn by the viewer (observed without cross talk), the emitted light beam must be transmitted through the quarter wave plate region forming portion. Referring to FIG. 17, when end points of the pixel 103*b* for the left eye are denoted by A and B, end points of the quarter wave plate region forming portion corresponding to the pixel 103b for the left eye are denoted by C and D, and intersections between lines AC and BD with a plane on which the viewer 207 is positioned are denoted by E and F, respectively, the zone W allowing stereoscopic imaging is between E–F. Further, an intersection of a perpendicular line from the point C and the plane on which pixels are formed is denoted by G and an intersection with the plane where the viewer 207 is positioned by H, the following relation holds, because of approximation between triangles CAG and CEH.

CG:CH=AG:EH d:L=B/2:(W–P1)/2 and therefore $$W=P1+L/d\times BM \qquad (4)$$

When pixel pitch is P=0.33 mm, black matrix width is BM=0.03 mm, thickness of opposing glass substrates is 1.1 mm, refractive index of the glass is n=1.52, the distance d of counter substrate in air is d=0.72 mm, the pitch of the half wave plate P1=0.33 mm and assuming that the viewer observes from a distance of L=350 mm, then the zone allowing stereoscopic imaging is W= about 14 mm, in accordance with the equation (4) above.

By contrast, when the polarizing film and the optical element or the circular polarization element are arranged inside the liquid crystal panel as in the present embodiment, the pixel for the left eye is close to the region of the quarter wave plate of the optical element or the circular polarization element. Therefore, in principle, the influence of parallax is eliminated.

In this manner, by arranging the polarizing film and the optical element or the circular polarization element on the side of liquid crystal material of the substrate, parallax can be reduced.

In the fourth embodiment, quarter wave plates 106b' and 106c' constituting optical element 106' are formed as stripes parallel to the scanning lines formed on glass substrate 102a, with the width of quarter wave plates 106a' and 106b' made approximately the same as the width of pixel 103, and directions of slow axis (or fast axis) being orthogonal to each other at every row of pixels. Polarizing film 101b is arranged on optical element 106'. At this time, the direction of slow axis (or fast axis) of quarter wave plates 106b' and 106c' is offset by 45° from the direction of polarization transmission axis of polarizing film 101b.

On polarizing film 101b, color filter 108a and black matrix 108b are formed. Thereafter, on color filter 108a and black matrix 108g, a transparent conductive film used as transparent electrode 103c, for example ITO, is formed by sputtering, for example, entirely over substrate 102b, and alignment film 105b is formed further thereon. In this manner, the opposing side substrate is formed. Other structure and method of manufacturing the liquid crystal display panel are the same as those of the third embodiment.

Because of the structure described above, light beams emitted from the pixel groups for the left eye and for the right eye are subjected to left and right (counterclockwise and clockwise) circular polarization by optical element 106', and therefore it is possible for a number of viewers to observe three-dimensional images, by wearing polarization binoculars 110 provided with circular polarization films 110a and 110b. It is possible to observe three-dimensional images even when a viewer 115 inclines his or her face.

Further, it is possible to observe two-dimensional images when the viewer does not wear the polarization binocular 110.

In the fourth embodiment, optical element 106' is formed on glass substrate 102b constituting liquid crystal display panel 121. However, another substrate 106a having optical element 106' thereon may be arranged on glass substrate 102b. At this time, substrate 106a may be removed from optical element 106', as needed.

In the fourth embodiment, color filter 108a and black matrix 108b are formed on polarization film 101b. However, color filter 108a and black matrix 108b may be formed between optical element 106' and polarization film 101b. Further, optical element 106' may be formed after color filter 108a and black matrix 108b are formed on glass substrate 102b.

(Fifth Embodiment)

In the fifth embodiment, an image display device providing both two-dimensional and three-dimensional displays in which the optical element described in the first or second embodiment is applied to liquid crystal display 130 will be described.

Figure 7:
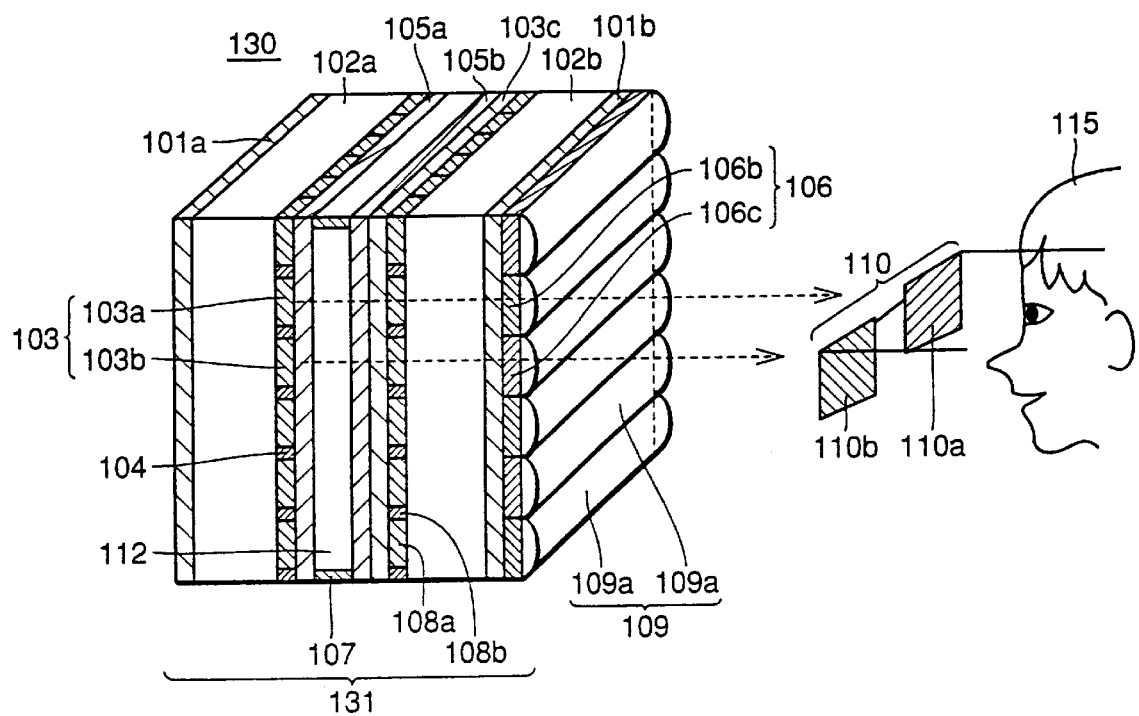
FIG. 7 shows a structure of an image display device in accordance with a fifth embodiment of the present invention.
Figure 8:
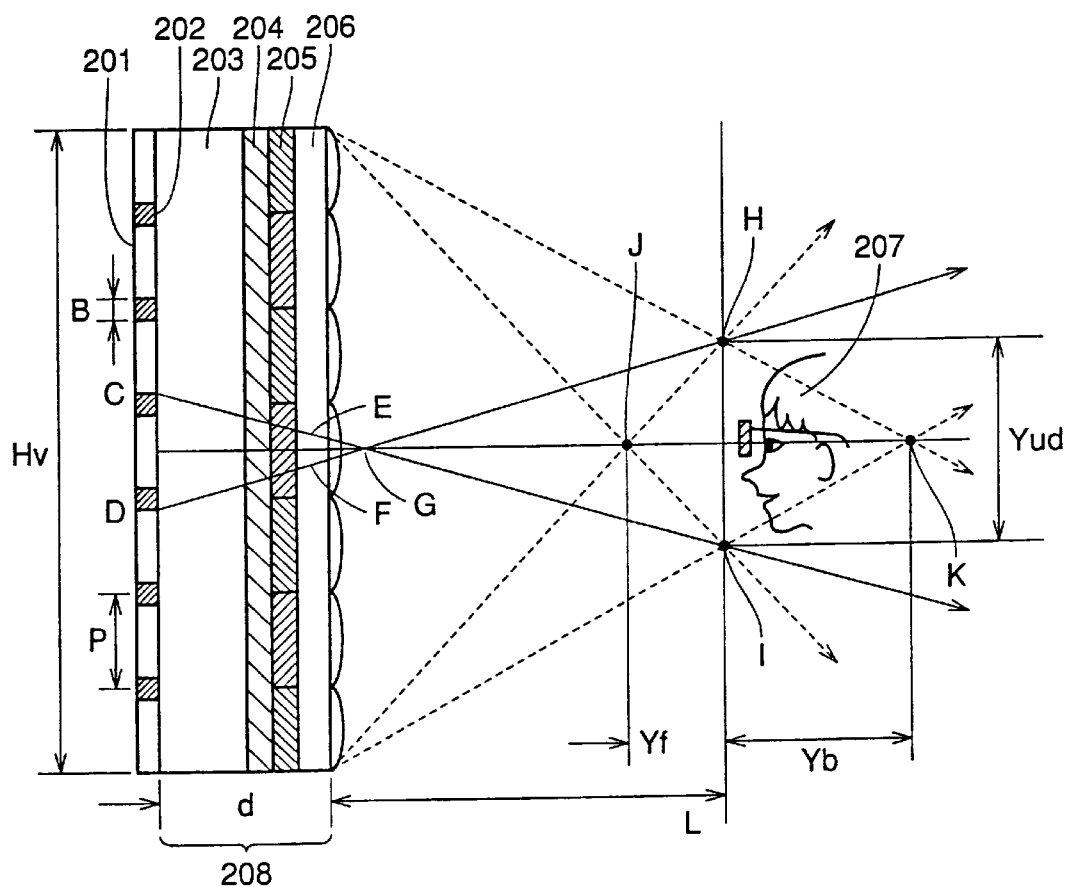
FIG. 8 is an illustration depicting the zone allowing stereoscopic imaging of the image display device in accordance with the fifth-embodiment of the present invention.
Figure 9:
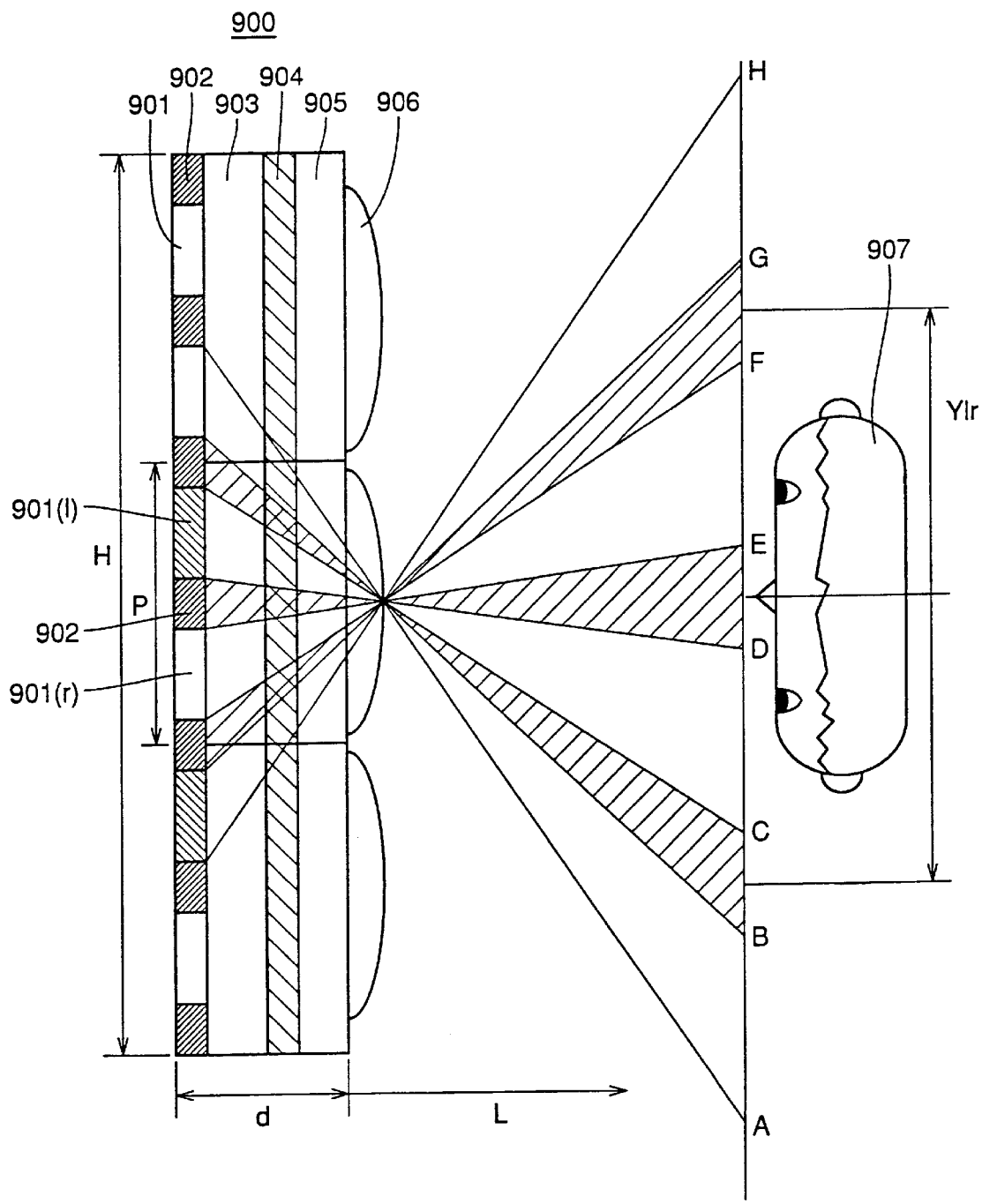
FIG. 9 is an illustration of the zone allowing stereoscopic imaging in the left/right direction in Autostereoscopic Imaging using a conventional lenticular lens.
Figure 10:
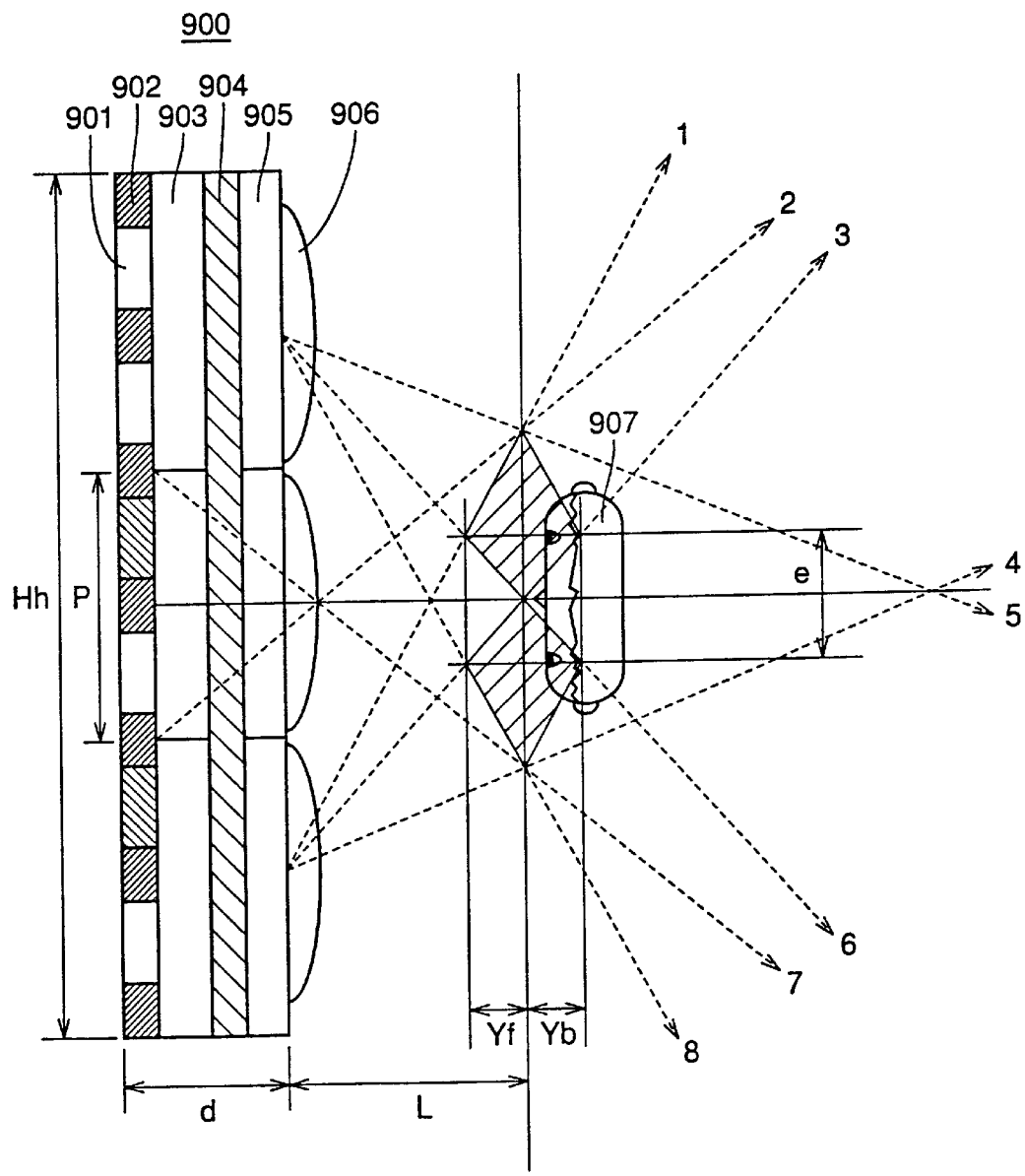
FIG. 10 is an illustration showing the zone allowing stereoscopic imaging in forward/rearward direction in Autostereoscopic Imaging using the conventional lenticular lens.
Figure 11:
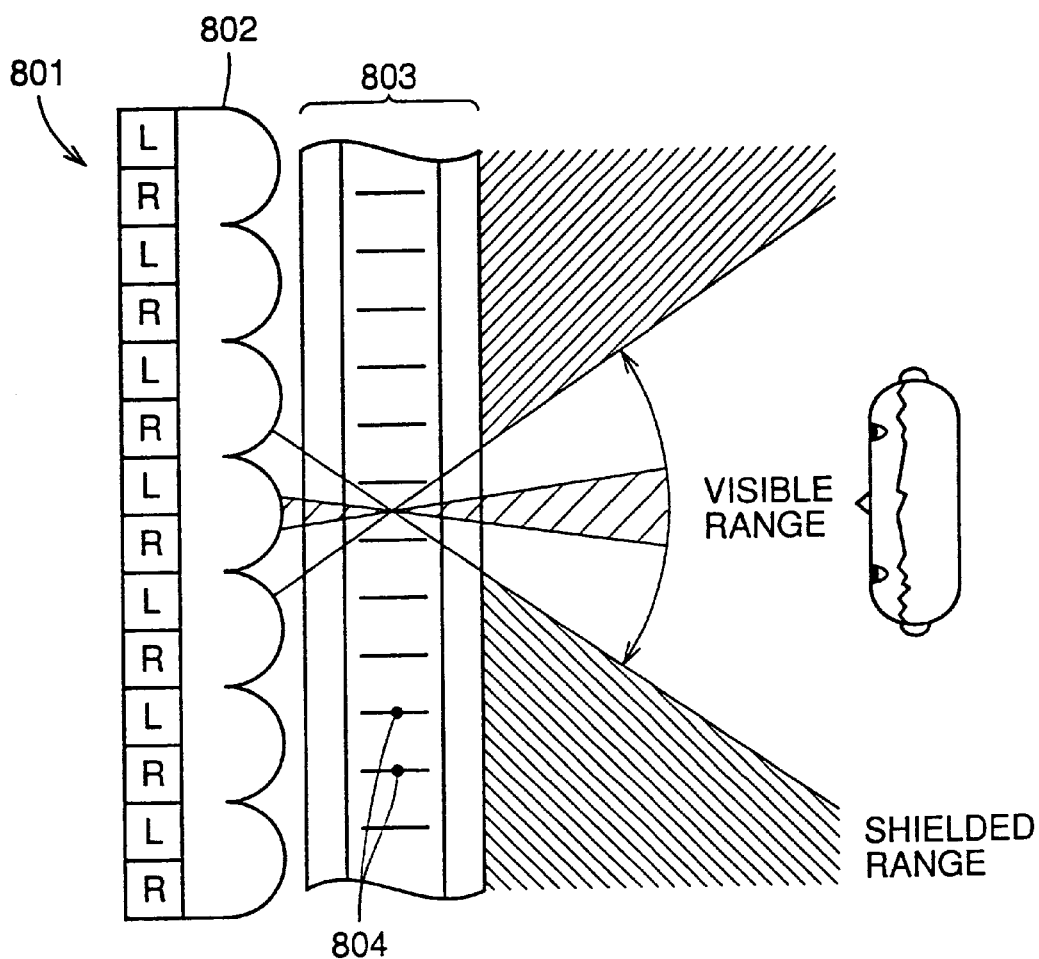
FIG. 11 schematically shows a structure of a stereoscopic image display device in accordance with Autostereoscopic Imaging using the conventional lenticular lens.
Figure 12:
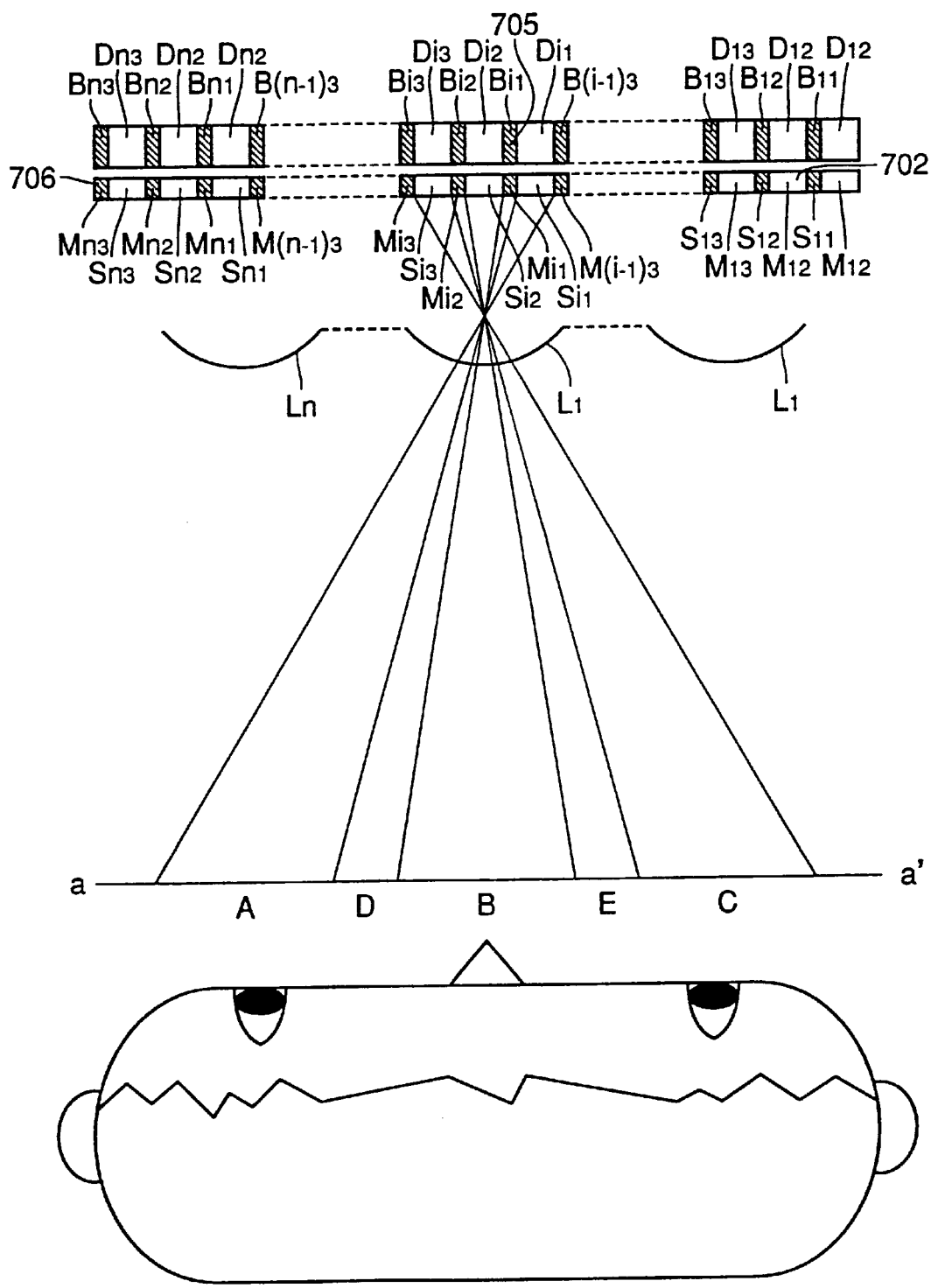
FIG. 12 schematically shows a structure of another stereoscopic image display device in accordance with Autostereoscopic Imaging using the conventional lenticular lens.
Figure 13:
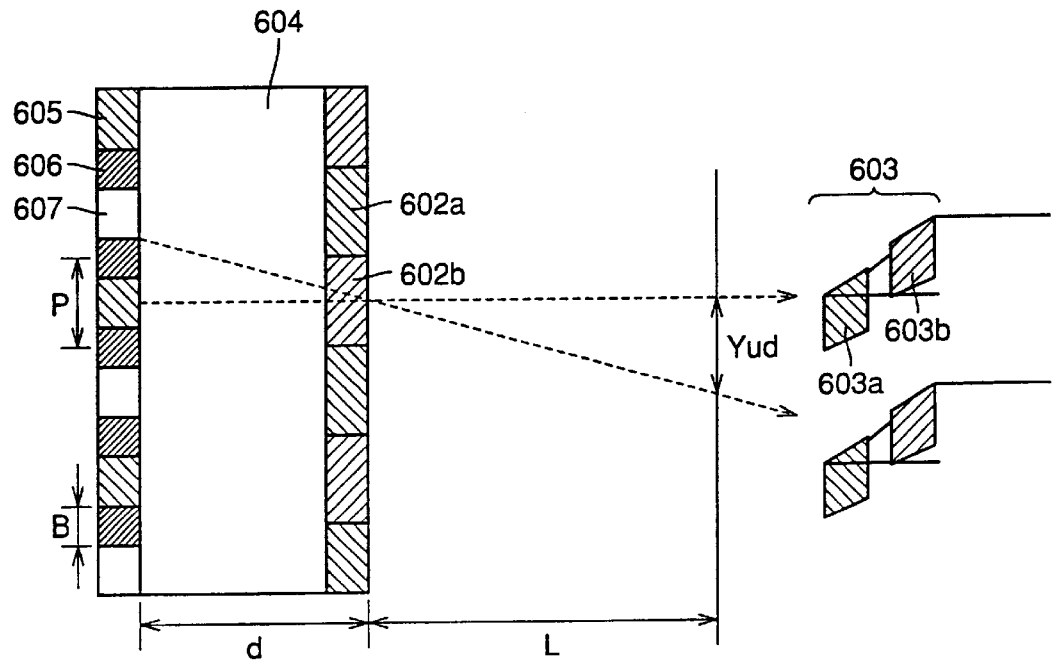
FIG. 13 schematically shows a structure of a conventional stereoscopic image display device in accordance with the first Polarizing Binocular Stereoscopic Imaging.
Figure 14:
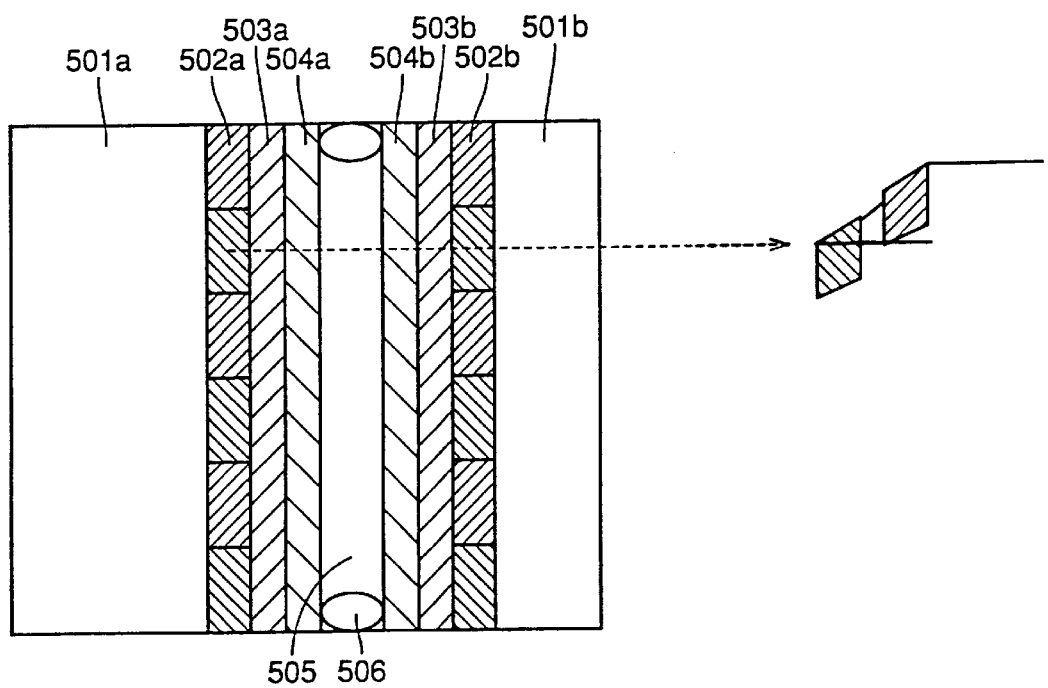
FIG. 14 schematically shows a structure of a conventional stereoscopic image display device of a second Polarizing Binocular Stereoscopic Imaging.

Referring to FIG. 7, an image display device providing both two-dimensional and three-dimensional displays fabricated in accordance with the present embodiment includes a liquid crystal display panel 131 of which structure and fabrication method are similar to those for the liquid crystal display panel 111 of the third embodiment shown in FIG. 5. Portions corresponding to those of the third embodiment are denoted by the same reference characters and detailed description thereof is not repeated here.

The fifth embodiment is characterized in that lenticular sheet 109 is provided such that one cylindrical lens 109a corresponds to one row of the pixel group for the left eye or one row of the pixel group for the right eye, in front of optical element 106, on the side of display surface of liquid crystal display panel 131. Therefore, each cylindrical lens 109a extends in the horizontal direction of the image screen (parallel to scanning lines), and corresponds to one row of pixels.

In the fifth embodiment, the pitch P1 of cylindrical lenses 109a of lenticular sheet 109 is set such that generation of moire fringes caused by parallax between pixels 103 and cylindrical lens 109a is prevented. More specifically, the pitch P1 of the cylindrical lens is set to satisfy the-following equation (5), where P represents the pitch of pixels 103 of liquid crystal display panel 111, d represents, in air, the distance from a plane where pixels 103 are formed to a plane where cylindrical lenses 109a are formed, and L represents distance from the viewer to the plane where the cylindrical lenses 109a are formed.

$$P1=PL/(d+L) \qquad (5)$$

In the fifth embodiment, the pitch of pixels 103 of liquid crystal display panel 131 is set to 0.33 mm, the distance L between the viewer and the plane on which pixels 103 are arranged is set to 350 mm, thickness of the counter substrate 102b is set to 1.1 mm, refractive index thereof is set to n=1.52 (in other words, the distance d in air between the plane where pixels 103 are arranged and the plane where cylindrical lenses 109 are formed is set to d=0.72 mm), and in accordance with the equation (5) above, the pitch P1 of cylindrical lenses 109a is set to 0.329 mm.

Further, in the fifth embodiment, lenticular sheet 109 is arranged such that each cylindrical lens 109a focuses light beams onto one point of the corresponding pixel.

Figure 16:
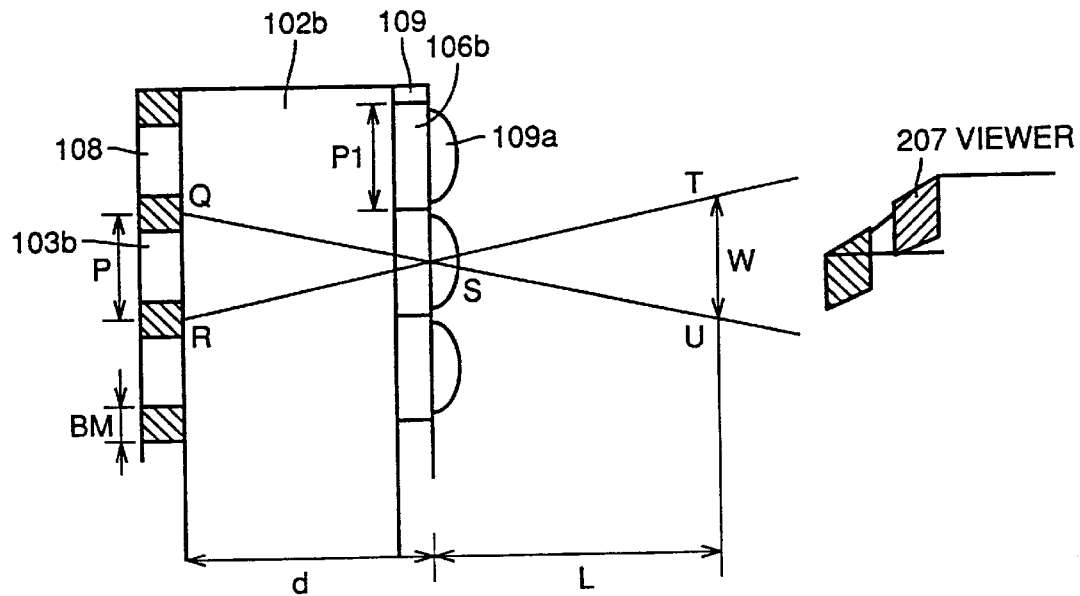
FIG. 16 is an illustration of the zone allowing stereoscopic imaging in the image display device in accordance with a fifth embodiment.

The size of the zone allowing stereoscopic imaging in the image display device in accordance with the fifth embodiment will be described with reference to FIG. 16. FIG. 16 is a cross section of the image display device where the optical element is arranged outside the liquid crystal panel. For simplicity, the polarization film, the alignment film and the like are not shown. Here, P represents the pixel pitch, BM represents the width of the black matrix, P1 represents the pitch of quarter wave plate, d represents distance in air from the plane where pixels are formed to the plane where cylindrical lenses 109a are formed, L represents distance from the viewer to the plane where cylindrical lenses 109a are formed, and W represents the zone allowing stereoscopic imaging.

Referring to FIG. 16, a light beam from one point of a pixel is enlarged by the cylindrical lens. The range where stereoscopic imaging is possible by this method corresponds to the range (side TU) on a line given by the beam emitted from the pixel and the central point (point Q or R) of the black matrixes provided on upper and lower sides passing through the central portion S of the cylindrical lens.

From approximation between triangles SQR and SUT, the following relation holds.

$$P:W=d:L$$

and therefore $$W=P \times L/d \qquad (6)$$

When the pixel pitch is P=0.33 mm, thickness of the counter substrate is 1.1 mm and refractive index of glass is n=1.52, and assuming that the distance d in air of the counter substrate is d=0.72 mm and the distance L=350 mm, the zone allowing stereoscopic imaging is W= about 160 mm from the equation (6) above.

By contrast, when the optical element is arranged outside the liquid crystal panel and lenticular lenses are not arranged, the zone allowing stereoscopic imaging was W about 14 mm. In this manner, by the provision of lenticular lenses, the influence of parallax can be reduced and the zone allowing stereoscopic imaging can be made wider.

Further, when such lenticular lenses are used, it becomes unnecessary to arrange the polarization film and the optical element or the circular polarization element within the liquid crystal panel. Therefore, limitations of impurities and the like causing lower voltage retention rate of the liquid crystal material imposed on the polarizing film, optical element or the circular polarization element when arranged in the liquid crystal panel are eliminated.

Further, in the fifth embodiment, one row of pixels arranged in the direction parallel to the scanning lines are specified as a pixel group providing an image corresponding to one eye (for example, left eye) and the next row of pixels are specified as a pixel group providing an image corresponding to the other eye (for example, right eye) as described above. In this manner, pixel groups for the left eye and pixel groups for the right eye are arranged alternately in the direction parallel to signal lines, that is, in the column direction. Further, the optical element or circular polarization element allowing emission of circular polarization light beams with different directions of rotation is arranged in front of the display element such that one stripe corresponds to one scanning line, so as to separate images for the left eye from images for the right eye. Accordingly, the zone allowing stereoscopic imaging in the left/right direction is not limited, and hence horizontal resolution is not degraded to ½. Further, since the pixel groups for the left eye and pixel groups for the right eye are arranged in this manner, it is possible to switch and alternately supply the image signals for the left eye and image signals for the right eye at every scanning line. Therefore, driving circuit can be simplified.

As described above, in the image display device in accordance with the fifth embodiment, the optical element and the circular polarization element are provided in front of the display device so that light beams emitted from the pixels for the left eye and from the pixels for the right eye have circular polarization of different directions of rotation. Further, a microlens array is provided adjacent to the optical element such that each microlens focuses light beam from only one of the pixel for the left eye and the pixel for the right eye. Therefore, as compared with the conventional stereoscopic image display device, the zone allowing stereoscopic imaging can be made wider. When pixels for the left eye are arranged in one row parallel to the scanning direction as a pixel group for the left eye, the pixels for the right eye are arranged in one row parallel to the scanning line and specified as a pixel group for the right eye, and further the pixel groups for the left eye and the pixel groups for the right eye are arranged alternately in the direction parallel to the signal lines, a lenticular sheet corresponding to respective pixel groups may be used as the microlens array.

Further, the cylindrical lenses of the lenticular sheet are arranged not by the same pitch as the pixel pitch but a corrected pitch. Accordingly, moire fringes generated by the parallax between the pixels arranged in a matrix and the lenticular sheet can be prevented.

Further, one cylindrical lens corresponds to one row of pixels arranged parallel to the scanning line, that is, arranged in the horizontal direction. Therefore, resolution in the horizontal direction of the image screen when the stereoscopic image is observed, is not degraded. Further, since pixel groups for the left eye and pixel groups for the right eye are arranged alternately scanning line by scanning line, it is possible to switch and supply the image signals for the left eye and image signals for the right eye at the period of 1H to the signal lines. Therefore, driving circuit can be simplified.

Further, light beams emitted from the pixel groups for the left eye and for the right eye are converted to left and right (counterclockwise and clockwise) circular polarization by optical element 106. Therefore, it is possible for a number of viewers to observe three-dimensional images when the viewers wear polarization binoculars 110 having circular polarization films. Further, it is possible to observe three-dimensional images even when a viewer inclines his or her face.

Further, it is possible to observe two-dimensional images, when the viewer does not wear the polarization binocular 110.

Though an active matrix type liquid crystal display panel is used as the liquid crystal display panel 131 in the fifth embodiment, display means for presenting images for the left eye and for the right eye is not limited thereto. A simple matrix type liquid crystal display panel, a spontaneous emitting display such as an EL (Electro Luminescence), a CRT or a plasma display, or a plasma address liquid crystal display panel may be used to obtain the same effects.

Though a liquid crystal display panel displaying in the TN (Twisted Nematic) mode employing TN liquid crystal is used in the fifth embodiment, the present invention is not limited thereto. The present invention may be used in any of the known display modes including STN (Super Twisted Nematic) mode, ferroelectric liquid crystal mode, anti-ferromagnetic liquid crystal mode, polymer dispersed type liquid crystal mode, axis-symmetrical alignment mode, electrically controlled birefringence mode, hybrid field effect mode, In-Plane Switching Mode, phase-transition mode employing smectic liquid crystal having electro clinic effect, dynamic scattering board, guest-host mode, liquid crystal complex film and so on. Those skilled in the art may appropriately select the display mode.

On the display panel, the polarization film and the optical element or the circular polarization element are arranged and the lenticular sheet is further arranged thereon. However, lenticular sheet may be arranged first and the polarization film and the optical element or the circular polarization element may be arranged thereon.

Though filter portions of R, G and B in the color filter are arranged as stripes in the fifth embodiment, the filter portions may be arranged in delta arrangement. At this time, the shape of quarter wave plates 106b and 106c constituting optical element 106 may be of any shape that approximately matches either one of the pixel groups for the left eye and the right eye, regardless of the shape of the color filter.

In the fifth embodiment, one row of pixels arranged in the direction parallel to the scanning lines are classified as a pixel group for the left eye or for the right eye. One column of pixels arranged parallel to signal lines may be specified as a pixel group for the left eye or the right eye. In that case, however, quarter wave plates 106b and 106c constituting optical element 106 should be formed to have the size approximately the same as the size of the pixels alternately column by column in the direction of signal lines, and cylindrical lenses 109a of lenticular sheet 109 should be arranged in perpendicular direction of the image screen (parallel to the signal lines).

As to the method of arranging optical element 106 on polarization film 101b, polarization film 101b may be arranged in contact with quarter wave plates 106b and 106c constituting optical element 106. When the substrate 106a of optical element 106 is formed of a transparent material such as glass or plastic, substrate 106a may be arranged in contact with polarization film 101b.

Further, after cylindrical lenses 109a are formed on optical element 106, the element may be arranged on polarization film 101b. At this time, when cylindrical lenses 109a are formed such that one corresponds to one row of pixels (or one column of pixels) of the pixel group for the left eye and the pixel groups for the right eye, then the cylindrical lenses may be formed to be in contact with either of quarter plates 106b and 106c and substrate 106a of optical element 106.

Optical element 106 arranged in this manner is adhered on polarization film 101b using a paste or an adhesive. The adhesive or paste may be cured by optical irradiation or heating, as needed.

When optical element 106 is used, a retarder film such as proposed in Japanese Patent Laying-Open No. 6-75116 may be provided between polarization film 101b and glass substrate 102b, and a retarder film having an arbitrary phase difference may be arranged. Especially when liquid crystal display panel 111 is in the STN mode, a retarder film having an arbitrary phase difference may also be arranged between glass substrate 102a and polarization film 101a. Provision of such retarder film allows viewing angle compensation and color compensation.

The optical element fabricated in accordance with the present invention generates elliptically polarized light beams with direction of polarization opposite to each other small region by small region, when a lineally polarized light beam is directed thereto. By using a birefringent photosensitive film, patterning is possible without separately using a resist material or the like, and hence optical element can be fabricated with improved production efficiency.

When the optical element fabricated in accordance with the present invention is applied to a liquid crystal display panel, for example, two-dimensional images can be observed normally, and when the viewer wears polarization binocular having circular polarization plates, three-dimensional images can be observed. Thus an image display device capable of displaying both two-dimensional and three-dimensional images is obtained.

Further, when the optical element is arranged within the liquid crystal display panel, parallax generated by an optically isotropic glass plate is eliminated.

Further, when a lenticular sheet is applied in addition to the optical element, to the liquid crystal display panel, parallax can be avoided even when the optical element is arranged on the surface of the liquid crystal display panel. Further, material can be selected without any limitation to the impurity degrading voltage retention rate.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image display device having a display screen on which a plurality of pixels are arranged, said display screen including a first region and a second region different from said first region, said plurality of pixels being classified into pixels belonging to said first region and pixels belonging to said second region, said image display device comprising:

image forming means for forming an image by displaying said plurality of pixels on said display screen; and an optical element provided relative to said display screen for differentiating state of polarizations of a light beam emitted from said first region and a light beam emitted from said second region from each other, said optical element including a transparent substrate having a main surface, a first birefringent photosensitive film arranged on a first region of said main surface corresponding to said first region of said display screen such that a slow axis or a fast axis thereof is aligned with a prescribed first direction, and a second birefringent photosensitive film arranged on a second region of said main surface corresponding to said second region of said display screen such that the slow axis or fast axis thereof is aligned with a prescribed second direction different from said first direction.

2. The image display device according to claim 1, wherein said image forming means includes a liquid crystal display panel having said display screen, and said optical element is attached to said liquid crystal display panel such that said first birefringent photosensitive film and said second birefringent photosensitive film are in contact with the display screen of said liquid crystal display panel.

3. The image display device according to claim 2, wherein said liquid crystal display panel includes first and second transparent substrates arranged such that main surfaces oppose to each other, a first circular polarization element provided on a rear surface of said first transparent substrate, liquid crystal sealed between said first and second transparent substrates, a circuit formed between said first and second transparent substrates for driving said liquid crystal, and a second circular polarization element provided on a rear surface of said second transparent substrate;

said optical element is attached on said second circular polarization element such that said first birefringent photosensitive film and said second birefringent photosensitive film are in contact with said second circular polarization element;

said image display device further comprising microlenses provided on said optical element corresponding to said first and second regions, respectively.

4. The image display device according to claim 3, wherein said pixels are arranged in a matrix of a plurality of rows and a plurality of columns, said first region includes pixels belonging to odd-numbered ones of said plurality of rows, and said second region includes pixels belonging to even-numbered ones of said plurality of rows.

5. The image display device according to claim 4, wherein said microlenses include a plurality of cylindrical lenses provided corresponding to respective rows.

6. The image display device according to claim 5, wherein said plurality of cylindrical lenses constitute one lenticular sheet.

7. The image display device according to claim 6, wherein a pitch P1 of arrangement of said plurality of cylindrical lenses is selected to satisfy the following equation:

$$P1 = P \cdot L/(d+L)$$

where P represents a pitch of arrangement of said pixels in column direction, d represents distance in air from said image display screen to a plane where said cylindrical lens is arranged, and L represents distance from a viewer to the plane where said cylindrical lenses are arranged.

8. The image display device according to claim 1, wherein said image forming means includes a liquid crystal display panel having said display screen, said liquid crystal display panel including two transparent substrates arranged opposing to each other, liquid crystal sealed between said two transparent substrates, and a circuit formed between said two transparent substrates for driving said liquid crystal, and said optical element is arranged between one of said two transparent substrates and said liquid crystal.

\* \* \* \* \*